(12) United States Patent
Akasaka

(10) Patent No.: US 9,581,855 B2
(45) Date of Patent: Feb. 28, 2017

(54) LIQUID CRYSTAL DEVICE, ELECTRONIC APPARATUS, AND METHOD OF MANUFACTURING LIQUID CRYSTAL DEVICE

(71) Applicant: Seiko Epson Corporation, Tokyo (JP)

(72) Inventor: Koichiro Akasaka, Ina (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 14/666,334

(22) Filed: Mar. 24, 2015

(65) Prior Publication Data

US 2015/0277187 A1 Oct. 1, 2015

(30) Foreign Application Priority Data

Apr. 1, 2014 (JP) ................................. 2014-075174

(51) Int. Cl.
*G02F 1/1335* (2006.01)
*H04N 5/74* (2006.01)
*H04N 9/31* (2006.01)

(52) U.S. Cl.
CPC .. *G02F 1/133526* (2013.01); *G02F 1/133512* (2013.01); *H04N 5/7441* (2013.01); *H04N 9/3152* (2013.01)

(58) Field of Classification Search
CPC ... G02F 2001/133607; G02F 1/133526; G02F 1/133512; G02F 1/0311; H04N 9/3152; H04N 5/7441; G02B 6/003; G02B 3/00; G02B 3/02; G02B 3/0006; G02B 3/0093
See application file for complete search history.

(56) References Cited

U.S. PATENT DOCUMENTS

| | | | | |
|---|---|---|---|---|
| 9,331,099 | B2 * | 5/2016 | Nimura | H01L 27/1214 |
| 2015/0042926 | A1 * | 2/2015 | Akasaka | G02F 1/133526 349/95 |
| 2015/0277187 | A1 * | 10/2015 | Akasaka | G02F 1/133526 349/57 |
| 2016/0018567 | A1 * | 1/2016 | Ito | G02B 3/0068 359/793 |
| 2016/0109752 | A1 * | 4/2016 | Tateno | G02F 1/134336 349/5 |
| 2016/0178965 | A1 * | 6/2016 | Takayama | G02B 5/08 359/626 |

FOREIGN PATENT DOCUMENTS

| | | |
|---|---|---|
| JP | 06-075212 A | 3/1994 |
| JP | 3071045 B | 7/2000 |
| JP | 2009-063888 A | 3/2009 |
| JP | 2011-022311 A | 2/2011 |
| JP | 2011-158755 A | 8/2011 |

* cited by examiner

*Primary Examiner* — Anne Hines
*Assistant Examiner* — Jose M Diaz
(74) *Attorney, Agent, or Firm* — ALG Intellectual Property, LLC

(57) ABSTRACT

A liquid crystal device comprising: a first lens array that is provided to be closer to a light incident side of the liquid crystal device than the light shielding portion, a second lens array that is provided between the first lens array and the light shielding portion. The second lens array includes a plurality of first lenses each of which has a surface convex toward the light shielding portion, and the second lens array includes a first slit which is provided between two first lenses adjacent to each other among the plurality of first lenses of the second lens array so as to extend toward the light shielding portion.

17 Claims, 12 Drawing Sheets

LIQUID CRYSTAL DEVICE, ELECTRONIC APPARATUS, AND METHOD OF MANUFACTURING LIQUID CRYSTAL DEVICE

BACKGROUND

1. Technical Field

The present invention relates to a liquid crystal device, an electronic apparatus, and a method of manufacturing the liquid crystal device.

2. Related Art

In an image display region of a liquid crystal device used as a light valve of a projector, there are provided pixel portions and an inter-pixel region. The pixel portions emit light. In the inter-pixel region, wires, which supply electrical signals to the corresponding pixel portions, are formed. For example, in the liquid crystal device, the corresponding inter-pixel region is covered by a light shielding portion, and light is not transmitted through the light shielding portion.

In such a liquid crystal device, it is preferable that an amount of light emitted from the pixel portions is as large as possible, that is, the light is as bright as possible. Thus, it is necessary to achieve high light use efficiency. In contrast, for example, the following configuration has been known: by forming microlenses on the counter substrate of the liquid crystal device or the like, light incident into a portion, which does not contribute to display of the liquid crystal panel, is converged on the pixel portions of the liquid crystal panel, and thus an actual aperture ratio of the liquid crystal panel is improved.

The following configuration has also been known: in order to further increase the actual aperture ratio, a plurality of microlenses is provided (for example, Japanese Patent No. 3071045, JP-A-2009-63888, JP-A-2011-158755, JP-A-2011-22311, and the like). With such a configuration, light, which is incident into the liquid crystal device, is concentrated through the microlenses, whereby the light can be transmitted to avoid the light shielding portion. Further, through other microlenses, the concentrated light is collimated into substantially parallel light, whereby a large amount of light can be made to be incident through a projection lens which is disposed on the rear side.

However, even in the configurations of Japanese patent No. 3071045, JP-A-2009-63888, JP-A-2011-158755, and JP-A-2011-22311, light, which is incident into the liquid crystal panel at a large angle to a line normal to a substrate, is not completely concentrated through microlenses, is incident on the light shielding portion in the inter-pixel region, and is not transmitted through the liquid crystal panel. In order to improve the actual aperture ratio, a structure, in which the light can be emitted toward the projection lens, is preferable.

SUMMARY

An advantage of some aspects of the invention is to improve an actual aperture ratio of a liquid crystal device.

According to an aspect of the invention, there is provided a liquid crystal device including: an element substrate and a counter substrate that face each other with a liquid crystal layer interposed therebetween; a pixel electrode that is provided on a surface of the element substrate close to the liquid crystal layer; a switching element that is provided between the element substrate and the pixel electrode; and a light shielding portion that shields light which is incident into the switching element, in which the liquid crystal device includes a first lens array that is provided to be closer to a light incident side of the liquid crystal device than the light shielding portion, and a second lens array that is provided between the first lens array and the light shielding portion, in which the second lens array includes a plurality of first lenses each of which has a surface convex toward the light shielding portion, and in which the second lens array includes a first slit which is provided between two first lenses adjacent to each other among the plurality of first lenses of the second lens array so as to extend toward the light shielding portion.

With such a configuration, the first and second lens arrays are disposed to be closer to the incidence side than the light shielding portion, and first slit is disposed on the boundary between the second lenses. Light, which will be incident on the light shielding portion, in the light emitted from the second lens array is reflected by the first slits, whereby it is possible to prevent the light from being incident on the light shielding portion. Thereby, it is possible to improve the transmittance of light.

In the liquid crystal device, in the second lens array, an optical path length adjustment layer may be formed to be close to the light shielding portion of the plurality of first lenses of the second lens array, and the first slit may be formed on the optical path length adjustment layer.

With such a configuration, the first slit are formed on the optical path length adjustment layer that covers the second lens array. Hence, light, which will travel toward the light shielding portion, in light refracted by the second lens array is reflected. As a result, it is possible to increase the transmittance.

In the liquid crystal device, the optical path length adjustment layer of the second lens array may include a material of which a refractive index is different from that of the plurality of first lenses of the second lens array, and parts partitioned by the first slit of the optical path length adjustment layer may not have to be joined while being in contact.

With such a configuration, the first slit is formed as boundary planes by which second materials constituting the optical path length adjustment layer are not joined. Consequently, the first slit is able to reflect the incident light.

The liquid crystal device may further include a third lens array that is provided between the second lens array and the light shielding portion, in which the third lens array includes a plurality of second lenses each of which has a surface convex toward the light shielding portion, and in which the third lens array includes second slit which is provided between two second lenses adjacent to each other among the plurality of second lenses of the third lens array so as to extend toward the light shielding portion.

With such a configuration, in addition to the first and second lens arrays, the third lens array is provided. As a result, it is possible to further improve the transmittance of light.

In the liquid crystal device, a width of the first slit closer to the light incident side may be narrower than a width of the first slit closer to the light shielding portion.

With such a configuration, the distance between the first slits adjacent to each other is narrower at a position further from the lenses. Consequently, light, which is emitted from the lenses and will travel toward the light shielding portion, can be reflected toward the centers of the pixel electrodes by the first slits.

In the liquid crystal device, the first lens array, the second lens array, and the first slits may be provided on the counter substrate.

With such a configuration, the first and second lens arrays are disposed on the counter substrate on the incidence side of light. When light is concentrated through the first and second lens arrays, by reducing the light incident on the light shielding portion, it is possible to improve the transmittance of light. Further, light, which is incident into the liquid crystal panel at a tilt angle, can be prevented from being incident on the light shielding portion by refracting the light toward the centers of the respective lenses.

Furthermore, when light is concentrated through the first lens array and the angle of the light is approximated to the vertical direction through the second lens array, the light can be made to be incident into the liquid crystal layer in a state where the direction of the light is approximate to the vertical direction. When the light is incident into the liquid crystal layer at an angle, the optical path length of the liquid crystal layer increases, the phase difference given by the liquid crystal layer is deviated, and thus this causes bright black. By making the light incident into the liquid crystal layer in a state where the light traveling direction is approximated to the vertical direction, it is possible to suppress bright black.

In addition, by forming the first slit on the counter substrate, the light, which will be incident on the light shielding portion at an angle, can be reflected, and can be incident on the pixel electrode. Thereby, it is possible to increase the transmittance of light.

In the liquid crystal device, the first lens array, the second lens array, and the first slit may be provided on the element substrate.

With such a configuration, the first and second lens arrays are disposed to be closer to the incidence side than the light shielding portion of the element substrate on the incidence side of light. When light is concentrated through the first and second lens arrays, by reducing the light incident on the light shielding portion, it is possible to improve the transmittance of light. Further, light, which is incident into the liquid crystal panel at an angle, can be prevented from being incident on the light shielding portion by refracting the light toward the centers of the respective lenses.

Furthermore, when light is concentrated through the first lens array and the angle of the light is approximated to the vertical direction through the second lens array, the light is incident into the liquid crystal layer in a state where the light is approximate to parallel light. As a result, it is possible to suppress bright black.

In addition, by forming the first slit on the counter substrate, the light, which will be incident on the light shielding portion at an angle, can be reflected, and can be incident on the pixel electrode. Thereby, it is possible to increase the transmittance of light.

An electronic apparatus may include the liquid crystal device.

With such a configuration, it is possible to obtain an electronic apparatus having a high transmittance of light and display quality with high contrast.

According to another aspect of the invention, there is provided a method of manufacturing a liquid crystal device including: forming a lens array shape section on a surface of a first material; forming a lens array, in which a plurality of convexes is arranged, by etching the lens array shape section and the surface of the first material so as to transfer a shape of the lens array shape section to the surface of the first material; and forming a first optical path length adjustment layer, which covers the lens array, and growing a slit, which is provided between two convexes adjacent to each other among the plurality of convexes of the lens array, by laminating a second material, of which an optical refractive index is different from the first material, on the lens array.

With such a configuration, by laminating the second material in the boundary portion (valley portion) between convexes on the lens array, it is possible to grow the slit from the boundary portion. The layer laminated by using the second material grows so as to expand a lamination target surface in the lamination process. In the boundary portion, uniform growth progresses from both convexes. Hence, growth directions on the both sides intersect at a narrow portion. The second materials, of which the growth directions intersect, are not joined. Thus, it is possible to form slit that are not joined.

The method of manufacturing a liquid crystal device may further include polishing the first optical path length adjustment layer by polishing a surface of the second material opposite to a surface thereof close to the first material, after the forming of the first optical path length adjustment layer.

With such a configuration, it is possible to smooth a surface of the layer on which the second material is laminated. Consequently, by planarizing valley portion as the boundary portion between the convexes of the microlens array, the slit can be made not to be formed on layers formed above the planarized layer.

The method of manufacturing a liquid crystal device may further include forming a second optical path length adjustment layer by further laminating the second material, after the polishing of the first optical path length adjustment layer.

With such a configuration, it is possible to form the second optical path length adjustment layer on which the slit is not formed. Consequently, it is possible to prevent the slit from having an effect on the layers formed above the optical path length adjustment layer. For example, when a common electrode is formed on the optical path length adjustment layer, it is possible to prevent the common electrode from being formed to be disconnected due to the effect of the slit.

BRIEF DESCRIPTION OF THE DRAWINGS

The invention will be described with reference to the accompanying drawings, wherein like numbers reference like elements.

FIG. 9A shows a state where a process of forming a first optical path length adjustment layer was performed, and FIG. 9B is an enlarged view of the vicinity of the second microlenses of FIG. 9A.

DESCRIPTION OF EXEMPLARY EMBODIMENTS

First Embodiment

Hereinafter, referring to the accompanying drawings, a first embodiment of the invention will be described.

Figure 1:
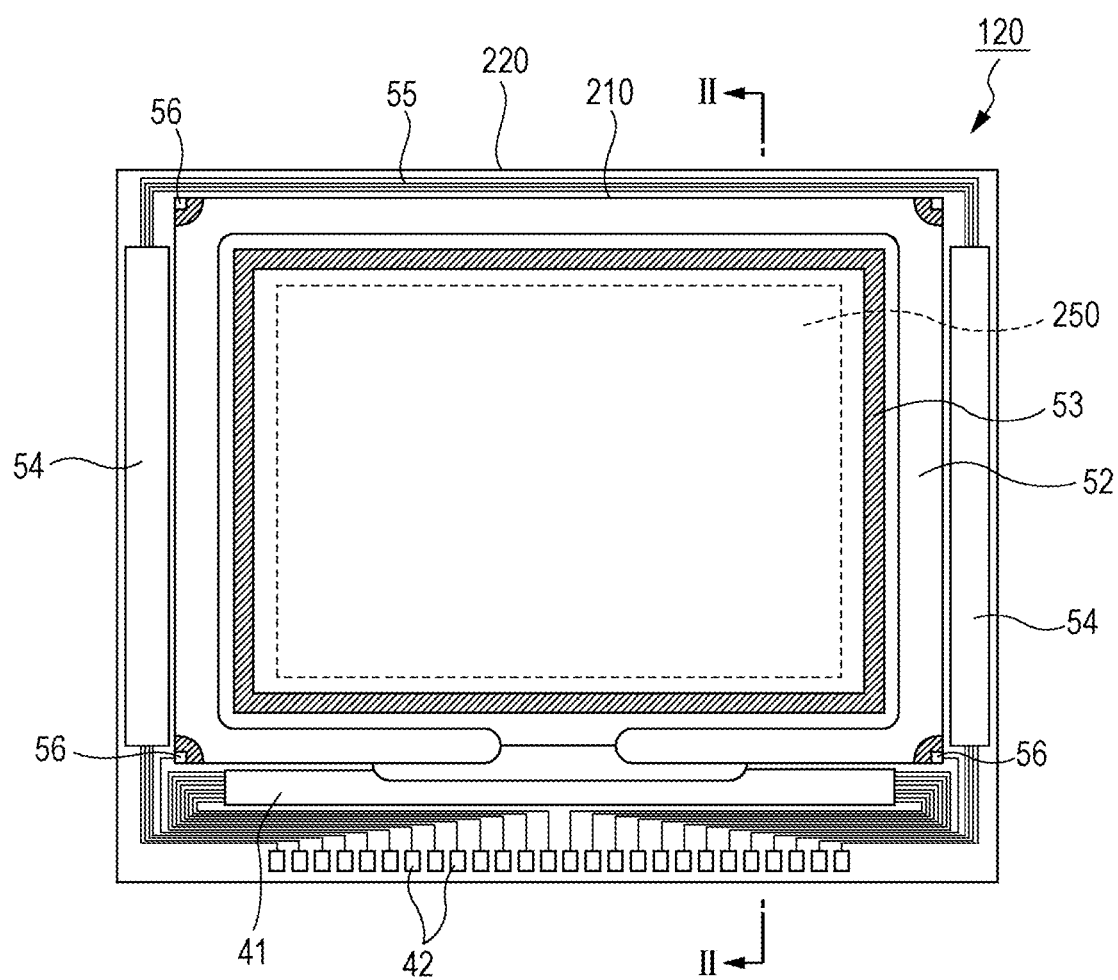
FIG. 1 is a plan view illustrating a configuration of a liquid crystal device according to a first embodiment.
Figure 2:
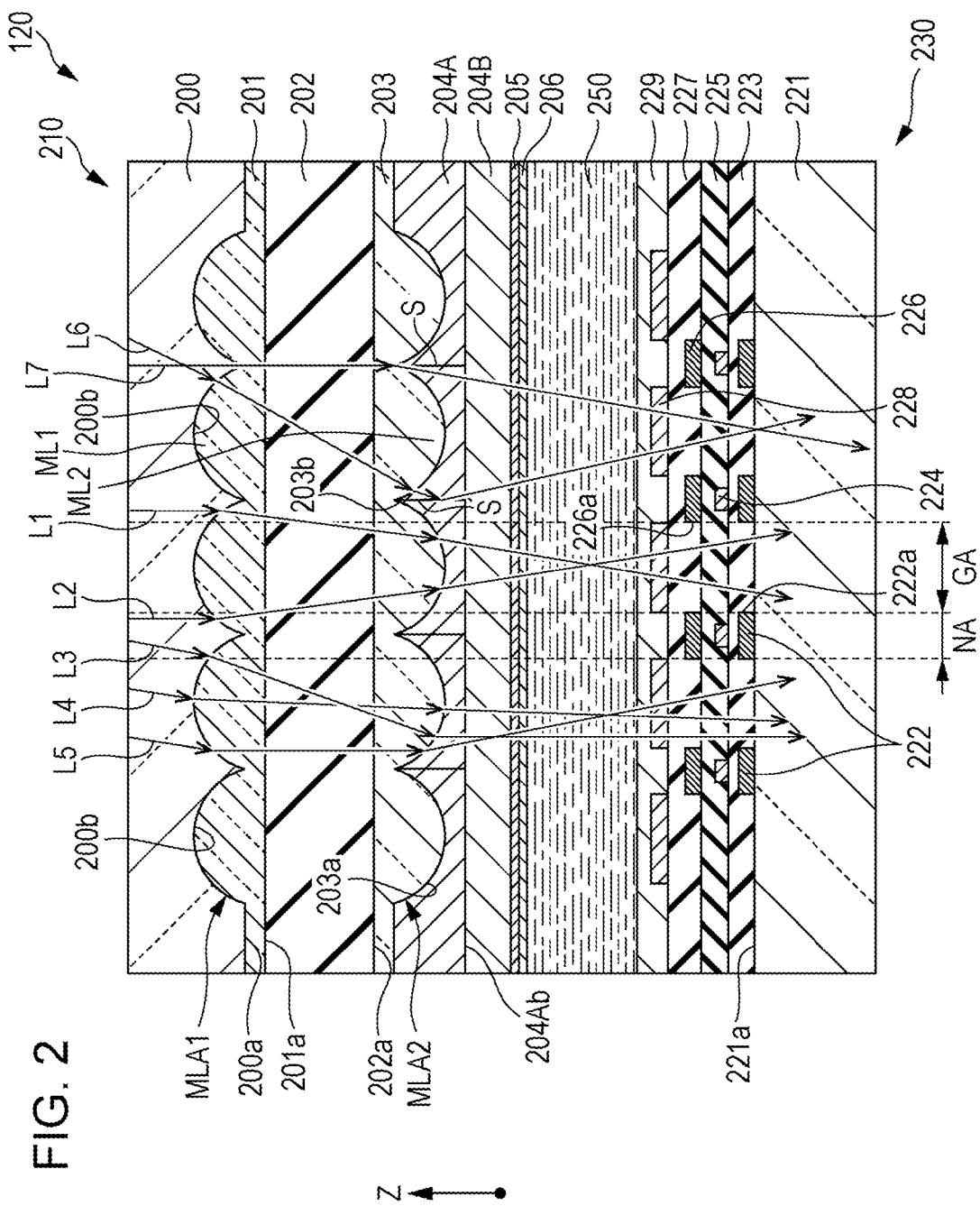
FIG. 2 is a diagram illustrating a cross-sectional configuration of the liquid crystal device according to the first embodiment.

FIG. 1 is a plan view illustrating a configuration of a liquid crystal device 120 according to the embodiment. FIG. 2 is a diagram illustrating a cross-sectional configuration of the liquid crystal device 120 taken along the II-II line.

As shown in FIG. 1, the liquid crystal device 120 has a configuration in which a TFT array substrate 230 (element substrate) and a counter substrate 210 are combined and bonded through a sealing material 52 provided between both of those. In a region partitioned by the sealing material 52, a liquid crystal layer 250 is enclosed. Inside a region in which the sealing material 52 is formed, a peripheral partition 53 made of a light shielding material is formed.

In a region outside the sealing material 52, a data line driving circuit 41 and external circuit mount terminals 42 are formed along one side of the TFT array substrate 230, and scanning line driving circuits 54 are formed along two sides adjacent to the side mentioned above. On the remaining side of the TFT array substrate 230, a plurality of wires 55 is provided. The wires 55 are for connecting the scanning line driving circuits 54 provided on both sides of the image display region. Further, inter-substrate conductive materials 56 for electrical conduction are provided between the TFT array substrate 230 and the counter substrate 210 on the corner portions of the counter substrate 210.

Instead of forming the data line driving circuit 41 and the scanning line driving circuit 54 on the TFT array substrate 230, for example, terminal groups may be electrically and mechanically connected through an anisotropic conductive film. The terminal groups are formed on peripheral portions of the TFT array substrate 230 and a tape automated bonding (TAB) substrate on which the driving LSI is mounted.

As shown in FIG. 2, the counter substrate 210 includes, in order from the light incidence side (the upper side in the drawing), a base 200, a first lens layer 201, a light transmission layer 202, a second lens layer 203, a first optical path length adjustment layer 204A, a second optical path length adjustment layer 204B, a common electrode 205, and an alignment film 206.

The base 200 is made of a material, such as glass or quartz, having an optical transparency. The base 200 has a plurality of first concave portions 200b which are formed on the first surface 200a close to the liquid crystal layer 250. The first concave portion 200b is configured to be concave toward the light incidence side (the outside of the counter substrate 210). The plurality of first concave portions 200b is disposed to respectively overlap with a plurality of pixels in plan view. In the embodiment, the plurality of first concave portions 200b is configured to be arranged in a matrix shape. The bottom of each of the plurality of first concave portions 200b is formed in a curved shape.

The first lens layer 201 is laminated on the substantially entire surface of the first surface 200a of the base 200 including the plurality of first concave portions 200b. The first lens layer 201 is made of, for example, a material (first material) of which the optical refractive index is higher than that of the base 200. As such a first material, for example, there is a material (for example, inorganic material), to which a plasma CVD method can be applied, or the like.

In the embodiment, the bottom of each first concave portion 200b is formed in a curved shape. Thus, light, which is incident on the base 200 and reaches the first concave portions 200b, is refracted toward the centers of the first concave portions 200b in plan view, due to the difference in optical refractive index between the base 200 and the first lens layer 201. As described above, parts of the first lens layer 201, which are provided inside the plurality of first concave portions 200b, respectively constitute first microlenses ML1 which concentrate light. The first microlenses ML1 are arranged in a matrix shape so as to respectively overlap with the plurality of pixels in plan view, and constitute a first microlens array MLA1.

The light transmission layer 202 is formed on a second surface 201a of the first lens layer 201 close to the liquid crystal layer 250. The light transmission layer 202 is formed of a material (second material) of which the optical refractive index is lower than that of the first lens layer 201. For example, the light transmission layer 202 may be formed of transparent silicon oxide ($SiO_2$).

The second lens layer 203 is formed of a third surface 202a of the light transmission layer 202 close to the liquid crystal layer 250. Convex portions (convexes) 203a, which are convex toward the liquid crystal layer 250, are formed on the second lens layer 203. The convex portions 203a are positioned to overlap with the first microlenses ML1 in plan view, and are arranged in a matrix shape so as to respectively overlap with the plurality of pixels in plan view, similarly to the first microlenses ML1. Further, the first optical path length adjustment layer 204A is formed to cover and planarize the unevenness caused by the convex portions 203a. The second lens layer 203 is formed of, for example, a material (first material) which is the same as those of the first lens layer 201 and the light transmission layer 202. Further, the first optical path length adjustment layer 204A is formed of, for example, a material (second material) of which the optical refractive index is lower than the material (first material) of the second lens layer 203.

Each convex portion 203a is formed in a curved shape, and constitutes a second microlens ML2. Light, which is transmitted through the second lens layer 203 and reaches the interface between the second lens layer 203 and the first optical path length adjustment layer 204A, is refracted toward the inner peripheral side of the second microlenses ML2 in plan view. The second microlenses ML2 are arranged in a matrix shape so as to respectively overlap with the plurality of pixels in plan view, and constitute a second microlens array MLA2.

The first optical path length adjustment layer 204A has slits S each of which extends from a valley portion (boundary portion) 203b between the adjacent second microlenses ML2 toward the liquid crystal layer 250.

The slits S partition the first optical path length adjustment layer 204A into parts corresponding to the respective second microlenses ML2. The adjacent second materials of the first optical path length adjustment layer 204A partitioned by the slits S are not joined while being in contract with each other. Consequently, each slit S serves as an interface, and light incident on the slit S is reflected.

The second optical path length adjustment layer 204B is formed on a polished surface 204Ab as a planar surface of the first optical path length adjustment layer 204A close to the liquid crystal layer 250. The slits S are discontinued at the boundary between the first optical path length adjustment layer 204A and the second optical path length adjustment layer 204B. The common electrode 205 is formed throughout the substantially entire surface of the second optical path length adjustment layer 204B. The alignment film 206 is formed to cover the common electrode 205.

The TFT array substrate 230 includes, in order from the light emission side (the lower side in the drawing), a base 221, a light shielding portion 222, an insulation layer 223, thin film transistors (TFTs, switching elements) 224, an insulation layer 225, a light shielding portion 226, an insulation layer 227, pixel electrodes 228, and an alignment film 229.

The base 221 is formed of a material, such as glass or quartz, having an optical transparency, similarly to the base 200. The light shielding portion 222 is provided on a first surface 221a of the base 221 close to the liquid crystal layer 250. The insulation layer 223 is formed to cover the first surface 221a of the base 221 including the light shielding portion 222.

Each TFT 224 is a switching element which drives the pixel electrode 228. The TFT 224 is configured to have a gate electrode and a semiconductor layer not shown in the drawing. On the semiconductor layer, a source region, a channel region, and a drain region are formed. A lightly doped drain (LDD) region may be formed on the interface between the channel region and the source region, or between the channel region and the drain region.

Each gate electrode is formed on the TFT array substrate 230 with a part (gate insulation film) of the insulation layer 225 interposed therebetween in a region overlapping with the channel region of the semiconductor layer in plan view. Although not shown in the drawing, the gate electrode is electrically connected to the scanning line 242 (refer to FIG. 3), which is disposed on the lower layer side, through a contact hole. With such a configuration, the TFT 224 is controlled to be turned on or off by applying a scanning signal.

The light shielding portion 222 and the light shielding portion 226 are formed in lattice shapes. The light shielding portion 222 and the light shielding portion 226 are disposed with the TFTs 224 interposed therebetween in the thickness direction of the TFT array substrate 230. By providing the light shielding portion 222 and the light shielding portion 226, the light is prevented from being incident on the TFTs 224.

The pixel electrode 228 is provided in a region overlapping with an opening portion 222a and an opening portion 226a in plan view. The TFT 224, the electrode and wire, which supply the electrical signal to the TFT 224 and are not shown in the drawing, and the like are provided in a region overlapping with the light shielding portion 222 and the light shielding portion 226 in plan view. In addition, the electrodes, the wires, and the like may have a function of the light shielding portion 222 and the light shielding portion 226. Further, the alignment film 229 is formed to cover the pixel electrodes 228.

In a display region of the TFT array substrate 230, there are opening regions GA and a light shielding region NA. The opening regions GA correspond to plane regions of the pixel electrodes 228. The light shielding region NA is a region other than the opening regions GA. The light shielding region NA is a region which is covered by the light shielding portion 222 and 226 in plan view and through which light is not transmitted. Each opening region GA is a region, through which light is transmitted, other than the light shielding region NA. Specifically, the opening region GA is a region in which a rectangular region (opening portion 222a) surrounded by the light shielding portion 222 overlaps with a rectangular region (opening portion 226a) surrounded by the light shielding portion 226.

The liquid crystal layer 250 is enclosed between the alignment film 206 close to the counter substrate 210 and the alignment film 229 close to the TFT array substrate 230.

Figure 3:
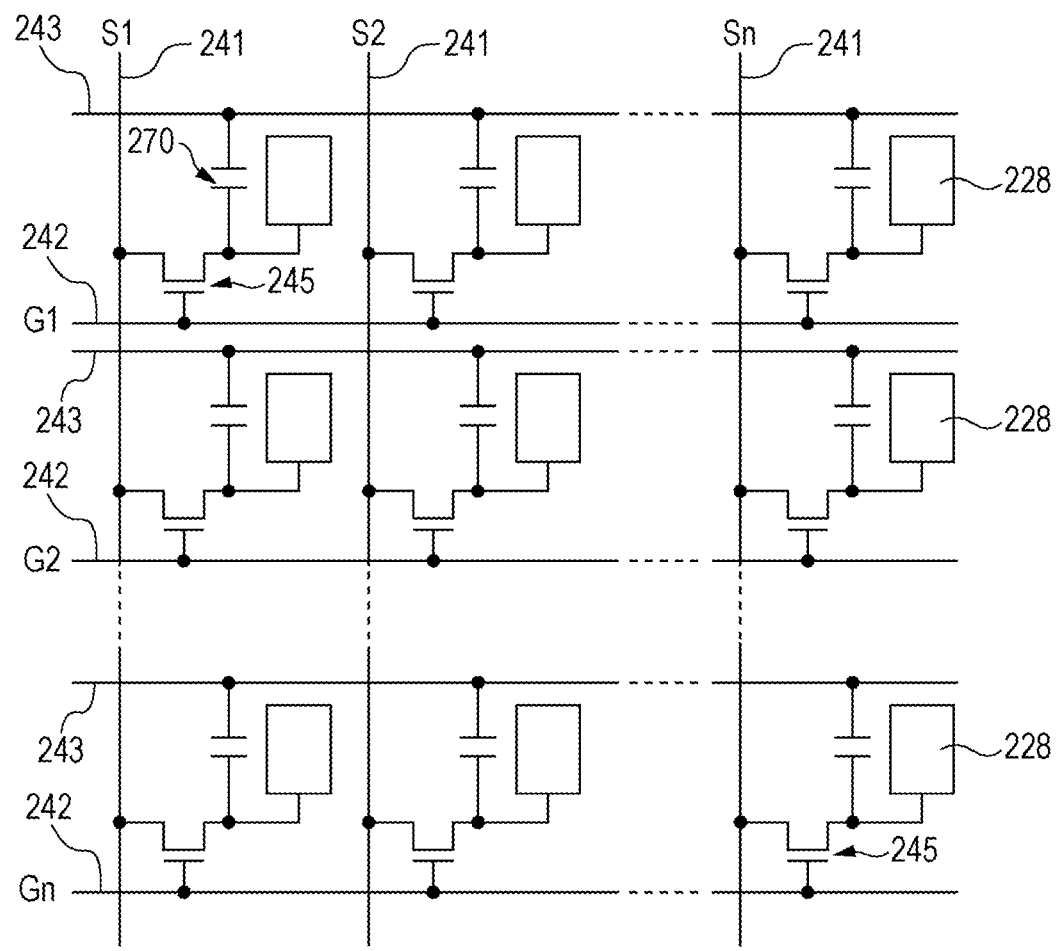
FIG. 3 is a wiring diagram illustrating an electrical configuration of the liquid crystal device according to the first embodiment.

FIG. 3 is a circuit diagram illustrating an electrical configuration of the liquid crystal device 120.

As shown in FIG. 3, in each of the plurality of pixels which constitute the image display region and are formed in a matrix shape, the pixel electrode 228 and the TFT 224 are formed. Each TFT 224 is electrically connected to the pixel electrode 228. Thus, at the time of an operation of the liquid crystal device 120, switching control is performed on the pixel electrode 228 so as to switch whether or not to supply an image signal to the pixel electrode 228. Each data line 241, to which the image signal is supplied, is electrically connected to a source region of the TFT 224.

Each scanning line 242 is electrically connected to a gate of the TFT 224. The liquid crystal device 120 is configured to line-sequentially apply scanning signals G1, G2, . . . , and Gm as pulses to the scanning lines 242 at predetermined timings. Each pixel electrode 228 is electrically connected to a drain of the TFT 224. In the pixel electrodes 228, by closing the TFTs 224 as switching elements during a certain time period, image signals S1, S2, . . . , and Sn supplied from the data lines 241 are recorded in liquid crystal of the respective pixels at predetermined timings.

The image signals S1, S2, . . . , and Sn with predetermined levels recorded in the liquid crystal are held in liquid crystal capacitances, which are formed between the pixel electrodes 228 and the common electrode 205 formed on the counter substrate 210, during a certain time period. In addition, in order to prevent the held image signals from leaking, storage capacitances 270 are formed between the pixel electrodes 228 and the capacitance lines 243, and are arranged in parallel with the liquid crystal capacitances. As described above, when a voltage signal is applied to the liquid crystal, an alignment state of the liquid crystal is changed by the applied voltage level. Thereby, the light incident into the liquid crystal is modulated, whereby it is possible to perform gray-level display.

The liquid crystal constituting the liquid crystal layer 250 modulates light by changing an orientation or an order of molecular association in accordance with the applied voltage level, whereby it is possible to perform gray-level display. For example, in a case of a normally-white mode, in response to the voltage which is applied on a basis of each pixel, the transmittance of the incident light decreases. In a case of normally-black mode, in response to the voltage which is applied on a basis of each pixel, the transmittance of the incident light increases. Thus, light having a contrast corresponding to the image signals is emitted from the liquid crystal device 120 as a whole.

As shown in FIG. 2, in the liquid crystal device 120 configured as described above, for example, the light L1 and light L2 (parallel light), which are vertically incident on the base 200 of the counter substrate 210, are transmitted through the first microlenses ML1 and the second microlenses ML2 in the counter substrate 210. During this period, the light L1 and the light L2 are refracted toward the center of the opening region GA through the first and second microlenses ML1 and ML2. Thereafter, the light L1 and the light L2 are incident into the liquid crystal layer 250 and the TFT array substrate 230. In the TFT array substrate 230, the light L1 and the light L2 pass through the opening region GA.

At the time point the light L1 and the light L2 are incident into the base 200, the first and second microlenses ML1 and ML2 concentrates the light L1 and the light L2, which are positioned in the light shielding region NA, in the opening region GA, in two steps. Thereby, the light L1 and the light L2 are not blocked by the light shielding portions 222 and 226, and thus it is possible to improve the actual aperture ratio of the liquid crystal device 120.

Light L3, L4, and L5 are obliquely incident in a direction in which those are slightly tilted relative to the base 200. The light L3, L4, and L5 are parallel with each other, and are respectively incident at different points on the curved surface of the first microlens ML1. The light L3, L4, and L5 are also refracted by the first and second microlenses ML1 and ML2, and can be concentrated in the opening region GA.

As described above, the first and second microlenses ML1 and ML2 function to concentrate light (for example L3, L4, L5), which is obliquely incident into the base 200, in the opening region GA. As a result, it is possible to improve the actual aperture ratio of the liquid crystal device 120.

The light L6 is incident in a direction in which the light is greatly tilted relative to the base 200. The light L6 is not sufficiently refracted by the first and second microlenses ML1 and ML2. Consequently, even after the light is emitted from the second microlens ML2, the light will travel in a direction in which the light will be incident on the light shielding portions 222 and 226. However, in the embodiment, the light L6 is emitted from the second microlens ML2, and is subsequently incident into the slit S. On the slit S, the light L6 is reflected, and travels toward the opening region GA.

The light L7 is incident toward the boundary between the first microlenses ML1 in the first microlens array MLA1. The light L7 is not sufficiently refracted through the first and second microlenses ML1 and ML2, and then will travel toward the light shielding portions 222 and 226. However, the light L7 is incident on the slit S, and is reflected toward the opening region GA.

As described above, by forming the slits S, the liquid crystal device 120 is able to collect some light components to be incident on the light shielding portions 222 and 226, in the light which is incident on the base 200, in the opening region GA. Thereby, it is possible to provide the liquid crystal device 120 having a high actual aperture ratio.

In addition, each slit S is formed to surround the second microlens ML2 in plan view. Consequently, also in a cross-sectional surface other than the cross-sectional surface shown in FIG. 2, the light, which will travel toward the light shielding region NA, can be returned back to the opening region GA.

In the liquid crystal device 120 of the embodiment, a magnitude relationship of the optical refractive indexes of the materials forming the base 200 of the counter substrate 210, the first lens layer 201, the light transmission layer 202, the second lens layer 203, the first optical path length adjustment layer 204A, and the second optical path length adjustment layer 204B is just an example. In order to increase the transmittance of light, by appropriately changing the materials forming the layers, it is possible to adjust the path of light.

For example, as the material (first material) forming the second lens layer, it is possible to use a material of which the optical refractive index is lower than that of the material (second material) forming the first optical path length adjustment layer 204A. In this case, each second microlens ML2 functions as a lens which diffuses light.

With such a configuration, by concentrating light through the first microlenses ML1, the angle of the light is approximated to the vertical direction of the liquid crystal layer 250 through the second microlens array. Thereby, the light can be made to be incident vertically to the liquid crystal layer 250. When the light is incident into the liquid crystal layer 250 at an angle, the optical path length of the light passing through the liquid crystal layer increases, the phase difference given by the liquid crystal layer is deviated, and thus this causes bright black. By making the light incident into the liquid crystal layer 250 in a state where the light traveling direction is approximated to the vertical direction, it is possible to suppress bright black.

In the liquid crystal device 120 of the embodiment, the counter substrate 210 does not have the light shielding portion, but may employ a structure in which the light shielding portion is provided on the counter substrate 210. In this case, for example, the light shielding portion can be provided between the first optical path length adjustment layer 204A and the second optical path length adjustment layer 204B. The light shielding portion is formed to overlap with the light shielding portions 222 and 226 of the TFT array substrate 230 in plan view.

However, in the liquid crystal device 120 of the embodiment, light is reflected by the slits S, whereby the direction of light can be changed from the light shielding regions NA to the opening regions GA. Consequently, contrary to the embodiment, even in a structure in which the light shielding portion is not provided on the counter substrate 210, it is possible to sufficiently prevent light from being incident on the TFTs.

Figure 4:
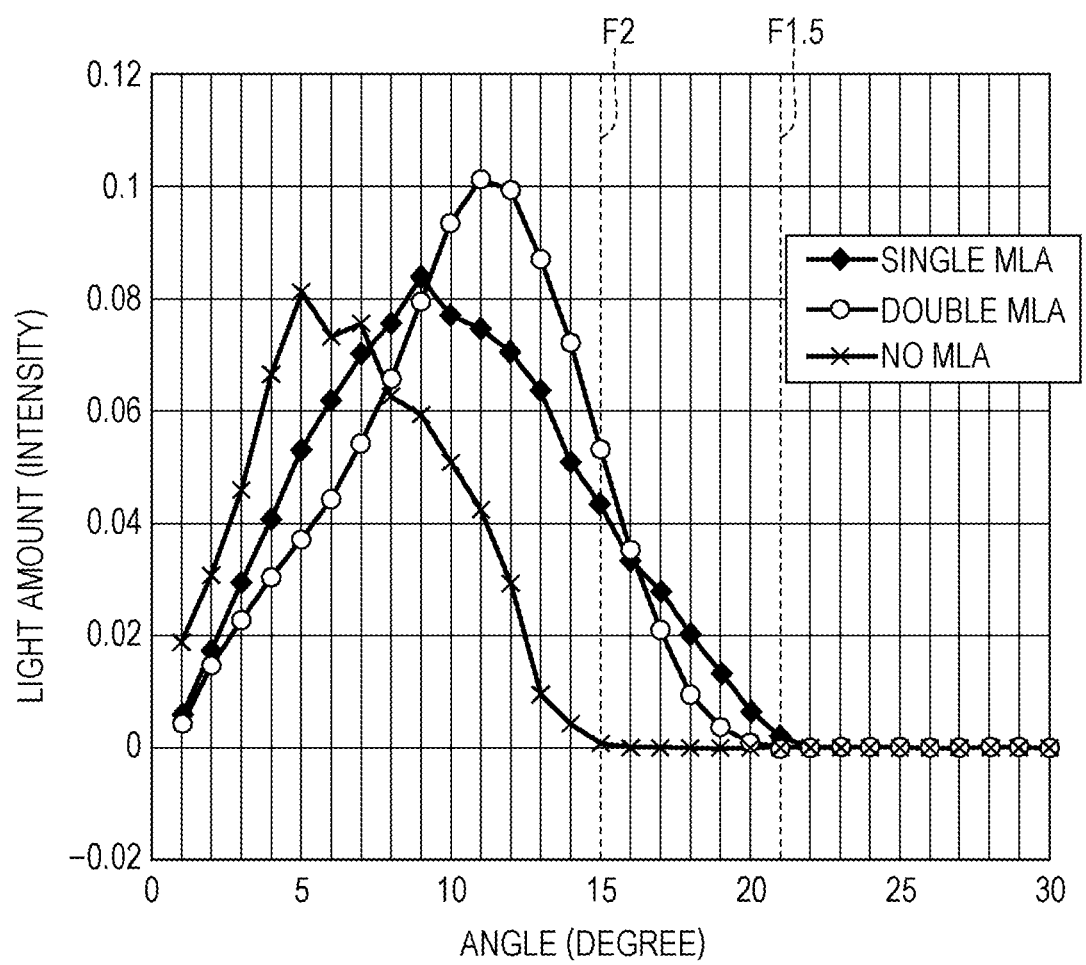
FIG. 4 is a graph illustrating a simulation result of a relationship between the light amount and the angle of light which is emitted from the liquid crystal device.

Next, referring to FIG. 4, a configuration of the embodiment, in which two microlens arrays (first and second microlens arrays MLA1 and MLA2) are provided on the counter substrate 210, is superior to a configuration in which only one microlens array is provided.

FIG. 4 shows simulation results of the angle of the light, which is emitted from the base 221 of the TFT array substrate 230, and the light amount of the light corresponding to the angle when the light perpendicular to the base 200 of the counter substrate 210 is incident thereon. FIG. 4 shows comparison of the following cases: a case where there is provided no microlens array (NO MLA); a case where there is provided one microlens array (Single MLA); and a case where there are two microlens arrays (Double MLA, it corresponds to the liquid crystal device 120 of the embodiment).

In FIG. 4, the straight lines corresponding to F numbers are shown. The straight lines represent the angular ranges in which light can be incident into the projection lens disposed on the rear side of the liquid crystal device 120. When the F number of the projection lens is 2 (F2), light can be incident into the projection lens at an angle of 15° or less. When the F number of the projection lens is 1.5 (F1.5), light can be incident into the projection lens at an angle of 21° or less.

In a case of NO MLA, the light is emitted from the liquid crystal device within a range of an angle of approximately 15° or less. Hence, the most of the light can be incident into the projection lens with either F1.5 or F2. However, the total light amount (representing an area) is reduced. The reason is that, since there is provided no microlens array, in the light shielding portions (corresponding to the light shielding portions 222 and 226 in FIG. 2), some of the light is blocked.

In the case where there is provided one microlens array (Single MLA), compared with the case of NO MLA, the total amount of emitted light increases. It would appear that the effect of transmitting light so as to avoid the light shielding portions through the MLA is enhanced. Further, in the case of using the projection lens with F1.5, the most of light can be incident into the projection lens. However, when the amount of light having the incident angle equal to or greater than 15° is large and the projection lens with F2 is used, it is difficult to use the light.

In the case where there are provided two microlens arrays (Double MLA), similarly to the case of one microlens array, by transmitting light so as to avoid the light shielding portions, the total light amount increases. Further, in the case of using the projection lens with F1.5, almost all the light can be incident into the projection lens. In contrast, when the projection lens with F2 is used, some of the light is not incident into the projection lens.

Comparing the case of one microlens array with the case of two microlens arrays, in the case of two microlens arrays, a peak of the light amount is set to be large. Further, when there are two microlens arrays and the projection lens with F2 is used, the light amount of undesirable light is small (in FIG. 4, the right side area with respect to the line of F2 is smaller).

By providing two microlens arrays, in the liquid crystal device 120, the light amount, which is peak to the angle, increases. Thereby, distribution of light has a steep shape. Thereby, spread of the distribution decreases, even in the case of using the projection lens with F2, it is possible to be incident more light to the projection lens. In addition, since the distribution of light has a steep shape, it is possible to increase the contrast.

Next, an example of a method of manufacturing the counter substrate 210 will be described with reference to FIGS. 5 to 12. It should be noted that, in FIGS. 5 to 12, compared with FIG. 2, the counter substrate 210 is reversed in the vertical direction. Further, in FIGS. 5 to 12, for convenience of description, in order to highlight characteristic sections, the components are shown at scales different from those of FIG. 2.

Figure 5:
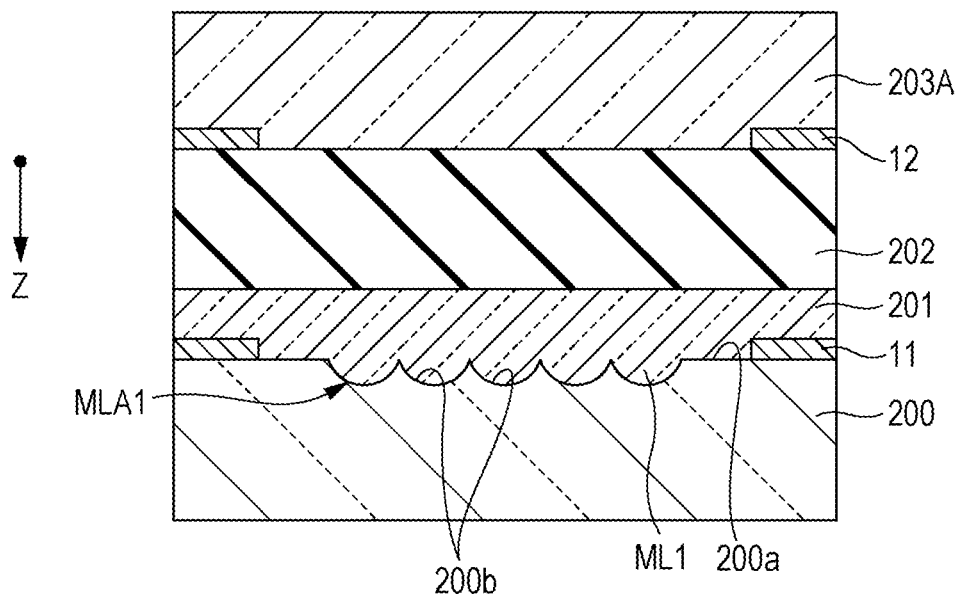
FIG. 5 is a cross-sectional view illustrating a state where a second lens layer was laminated, in a process of manufacturing the liquid crystal device according to the first embodiment.

First, as shown in FIG. 5, the base 200, the first lens layer 201, the light transmission layer 202, and the foundation lens layer 203A are formed.

In the base 200, the first concave portions 200b are formed on the first surface 200a on which the first lens layer 201 is formed, and the first lens layer 201 is laminated to cover the first concave portions 200b. Thereby, the first microlenses ML1 are formed as an array.

Both the first lens layer 201 and the foundation lens layer 203A are made of the first material. The light transmission layer 202 is made of the second material of which the optical refractive index is lower than that of the first material.

The first microlenses ML1 are formed through, for example, the following processes.

First, a mask resistant to etching is laminated on the first surface 200a. Next, a hole is formed at the center of the first microlens ML1 of the mask. Further, wet etching is performed through the mask. Thereby, through the holes, the first lens layer 201 is etched, and the first concave portions 200b are formed. The first microlenses ML1 can be formed by covering the first concave portions 200b with the first lens layer 201.

In addition, first marks 11 are formed in the vicinities of the edge portions of the base, between the base 200 and the first lens layer 201. Further, second marks 12 are formed between the light transmission layer 202 and the foundation lens layer 203A. The first and second marks 11 and 12 function as alignment marks for respectively aligning the arrays of the first and second microlenses ML1 and ML2.

Figure 6:
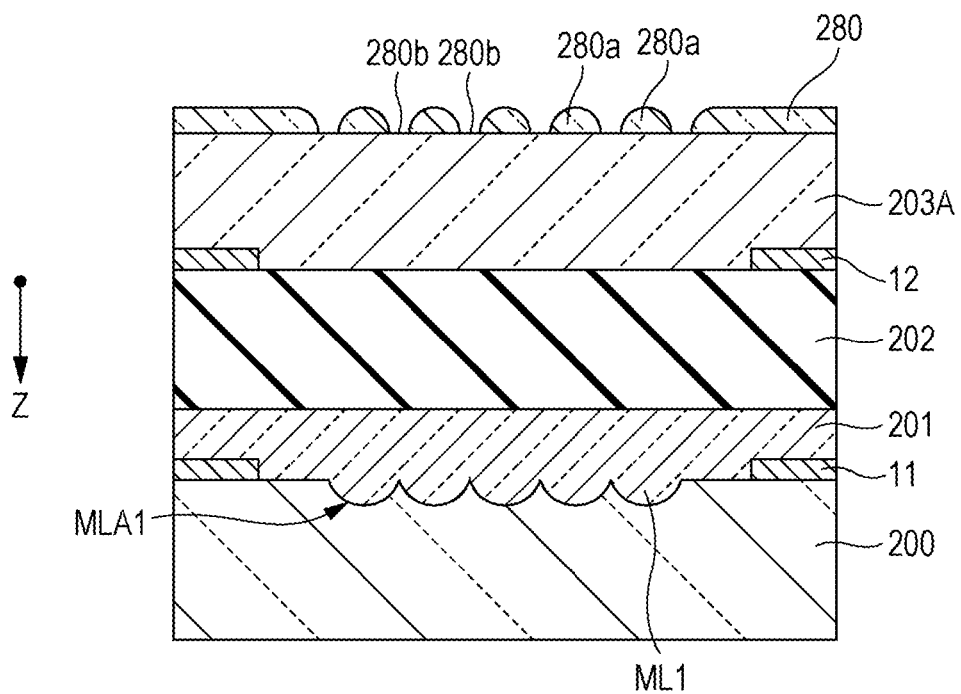
FIG. 6 is a cross-sectional view illustrating a state where a lens array shape section was formed on the second lens layer, in the process of manufacturing the liquid crystal device according to the first embodiment.

Next, as shown in FIG. 6, a lens array shape section 280 is formed on the foundation lens layer 203A made of the first material. In this process, as the lens array shape section 280, a plurality of convex portions (convexes) 280a corresponding to a plurality of second microlenses ML2 (refer to FIG. 2) is formed. Further, between the plurality of convex portions 280a, the convex portions 280a are not formed, and valley portions 280b, in which the foundation lens layer 203A is exposed, are arranged.

The lens array shape section 280 is formed in a well-known method such as a photolithography method. In this case, for example, a surface of the foundation lens layer 203A is coated with positive-type photosensitivity resin by about 10 μm, the photosensitivity resin is exposed using a gray-scale mask or the like, and is thereafter developed, whereby it is possible to form the lens array shape section 280.

As the gray-scale mask, for example, a mask having the following configuration is used: microscopic holes are formed to have sizes within the grid size equal to or less than the resolution limit of the exposure apparatus used at the time of exposure, and the transmittance of light is controlled by changing the sizes of the holes. It should be noted that design is made in advance such that the transmittance of light is higher at a position closer to an outer peripheral portion than the center of each convex portion 280a in plan view.

Examples of the method of forming the lens array shape section 280 may include not only the photolithography method but also, for example, a reflow method of performing a reflow process performed through heat, a multiplex exposure method of using a plurality of photomasks of which the aperture diameters change stepwise, and the like.

Next, an etching process is performed on the lens array shape section 280 and the foundation lens layer 203A by using a dry etching apparatus such as inductively coupled plasmas (ICP) apparatus. Through the process, the lens array shape section 280 and the foundation lens layer 203A are gradually removed in the thickness direction (Z direction).

Figure 7:
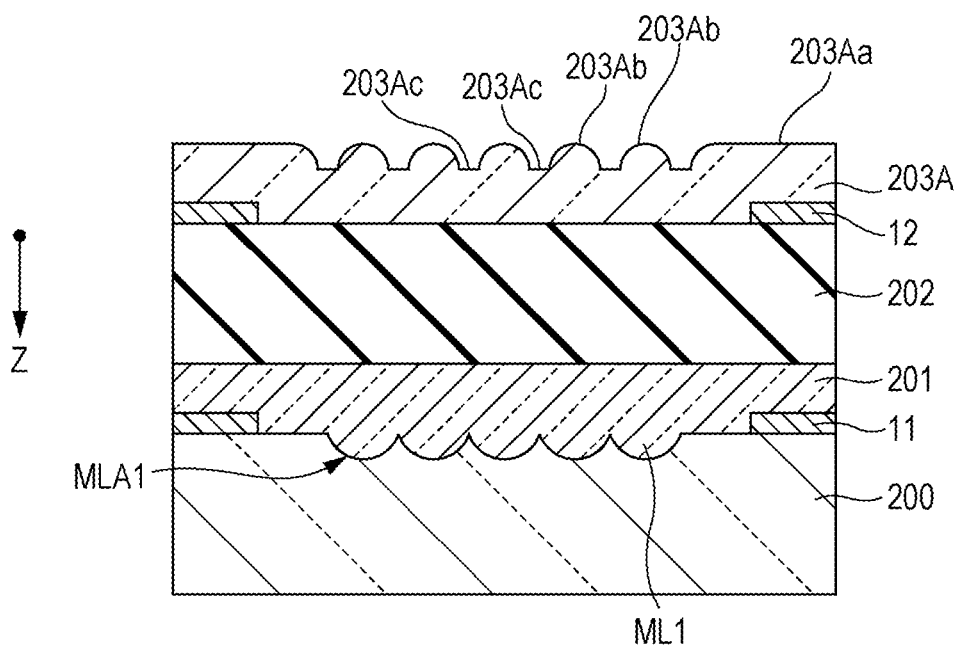
FIG. 7 is a cross-sectional view illustrating a state where a lens foundation surface was formed by performing an etching process, in the process of manufacturing the liquid crystal device according to the first embodiment.

As shown in FIG. 7, by performing the above-mentioned dry etching process until all the lens array shape section 280 is removed, a lens foundation surface 203Aa is formed on the foundation lens layer 203A (a process of forming the microlens array). The lens foundation surface 203Aa has a shape in which the lens array shape section 280 is transferred. Consequently, on the lens foundation surface 203Aa, convex portions (convexes) 203Ab and planar portions 203Ac are formed. The convex portion 203Ab corresponds to the convex portion 280a of the lens array shape section 280, and the planar portion 203Ac corresponds to the valley portion 280b.

Figure 8:
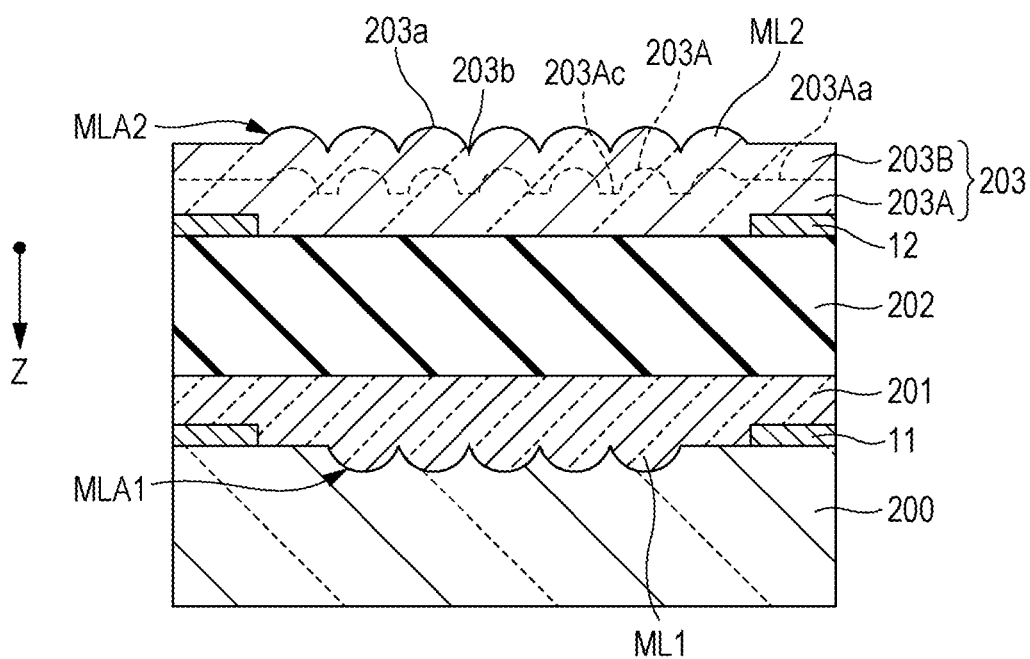
FIG. 8 is a cross-sectional view illustrating a state where second microlenses were formed by forming a surface lens layer on the lens foundation surface, in the process of manufacturing the liquid crystal device according to the first embodiment.

Next, as shown in FIG. 8, a surface lens layer 203B made of the first material is laminated on the lens foundation surface 203Aa. The lamination process can be performed by an existing evaporation method.

Both the foundation lens layer 203A and the surface lens layer 203B are made of the first material, and a boundary is not formed therebetween. The foundation lens layer 203A and the surface lens layer 203B constitute the second lens layer 203.

It should be noted that the surface lens layer 203B may be formed of a material of which the optical refractive index is different from that of the foundation lens layer 203A. In this case, a boundary is formed between the foundation lens layer 203A and the surface lens layer 203B. By using refraction of light at the related boundary, it is possible to increase the transmittance of light.

The surface lens layer 203B is laminated to have a shape as an enlarged shape of the lens foundation surface 203Aa. The planar portions 203Ac of the lens foundation surface 203Aa are covered by the surface lens layer 203B. Further, a surface of the surface lens layer 203B has a shape in which the convex portions 203a are continuously formed, and steep valley portions 203b (boundary portions) are formed at the boundary portion of the convex portions 203a. The convex portion 203a constitutes the second microlens ML2.

Figure 9A:
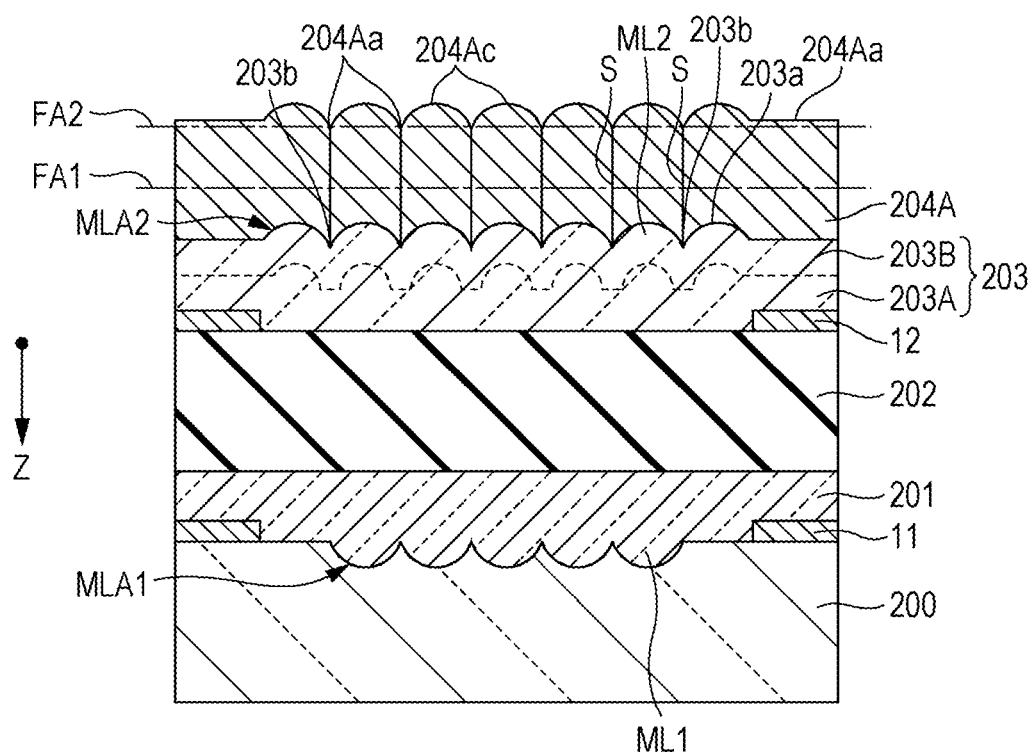
FIGS. 9A and 9B are cross-sectional views in the process of manufacturing the liquid crystal device according to the first embodiment, where

Next, as shown in FIG. 9A, the first optical path length adjustment layer 204A made of a second material is laminated on the surface lens layer 203B (a process of forming the first optical path length adjustment layer). The process of forming the first optical path length adjustment layer can be performed through the existing evaporation method. In particular, it is preferable that the process is performed through the chemical vapor deposition (CVD).

In the process of forming the first optical path length adjustment layer, the first optical path length adjustment layer 204A is laminated, and the slits S are formed inside the first optical path length adjustment layer 204A. Inside the first optical path length adjustment layer 204A, each slit S grows in a lamination direction (−Z direction) from the valley portion 203b of the surface of the surface lens layer 203B.

In the process of forming the first optical path length adjustment layer, the first optical path length adjustment layer 204A grows to have a shape as an enlarged shape of the surface lens layer 203B. In each valley portion 203b, both the convex portions 203a uniformly grow, and thus the growth directions thereof intersect at the narrow portion. At each intersection portion, each slit S is formed as a boundary line between the growth directions.

Further, the shapes of the convex portions 203a and the valley portions 203b of the surface lens layer 203B are transferred onto the surface 204Aa of the first optical path length adjustment layer 204A, and the convex portions (convexes) 204Ac and the valley portions (boundary portions) 204Ad are formed.

Figure 10:
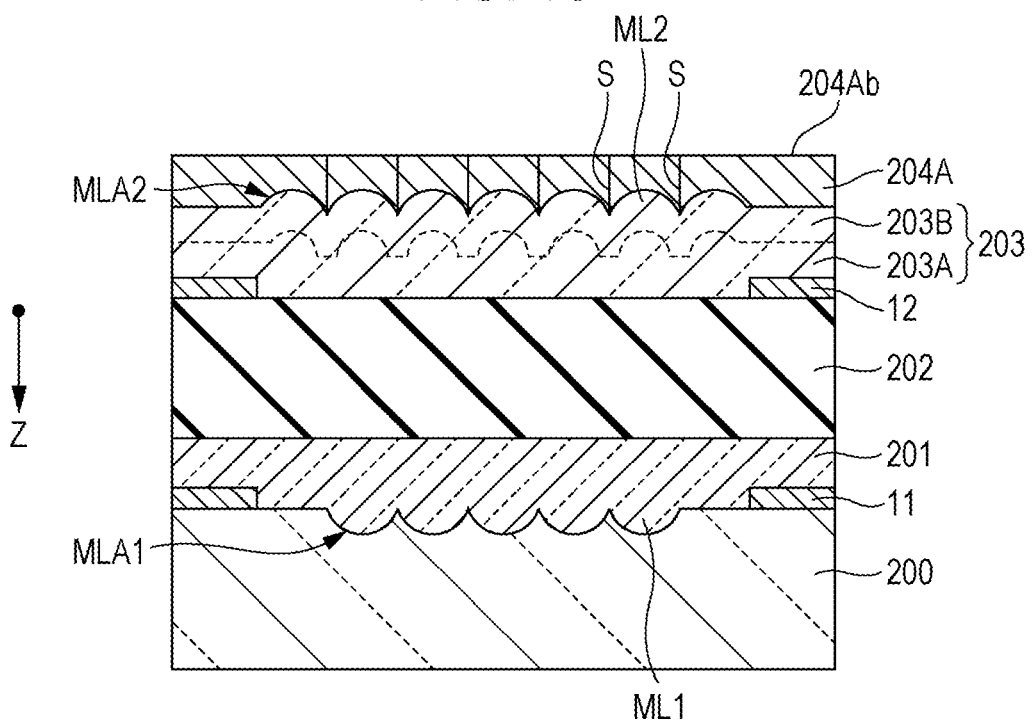
FIG. 10 is a cross-sectional view illustrating a state where a process of polishing the first optical path length adjustment layer was performed, in the process of manufacturing the liquid crystal device according to the first embodiment.

Next, as shown in FIG. 10, by polishing the surface 204Aa of the first optical path length adjustment layer 204A, the polished surface 204Ab is formed on the first optical path length adjustment layer 204A (a process of polishing the first optical path length adjustment layer). The process of polishing the first optical path length adjustment layer is performed such that the unevenness of the surface 204Aa of the first optical path length adjustment layer 204A is completely planarized until the planarized surface reaches, for example, a target line FA1 shown in FIG. 9A.

By performing process of polishing the first optical path length adjustment layer, the slits S do not continuously grow when another layer is laminated above the first optical path length adjustment layer 204A.

Figure 11:
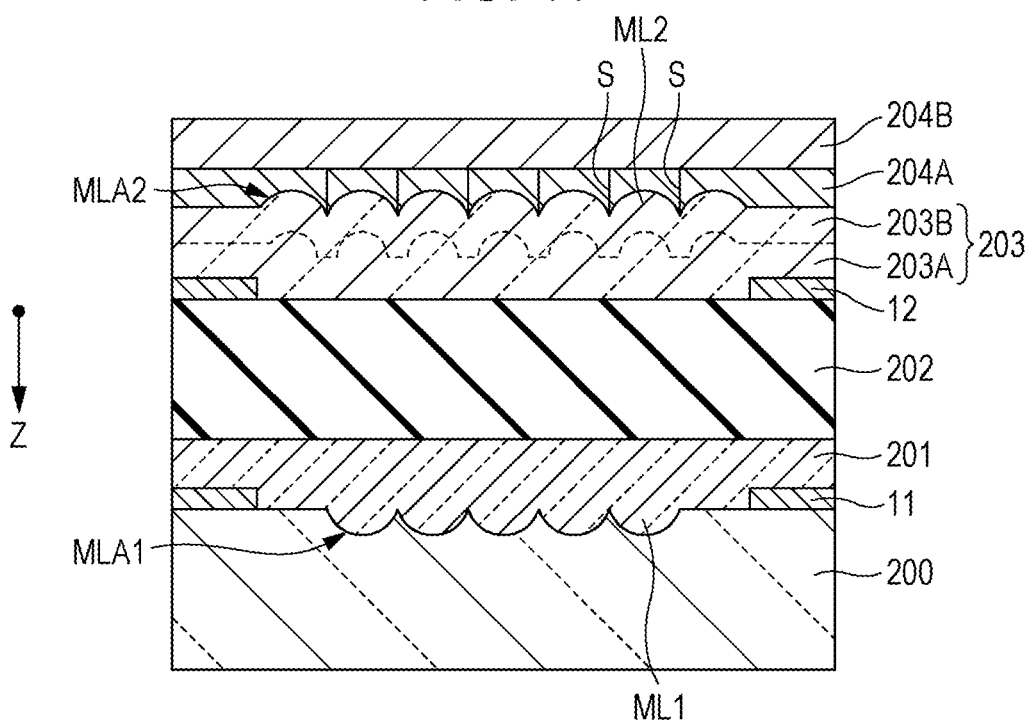
FIG. 11 is a cross-sectional view illustrating a state where a process of forming a second optical path length adjustment layer was performed, in the process of manufacturing the liquid crystal device according to the first embodiment.

Next, as shown in FIG. 11, the second optical path length adjustment layer 204B made of the second material is laminated on the polished surface 204Ab of the first optical path length adjustment layer 204A (a process of forming the second optical path length adjustment layer).

Figure 12:
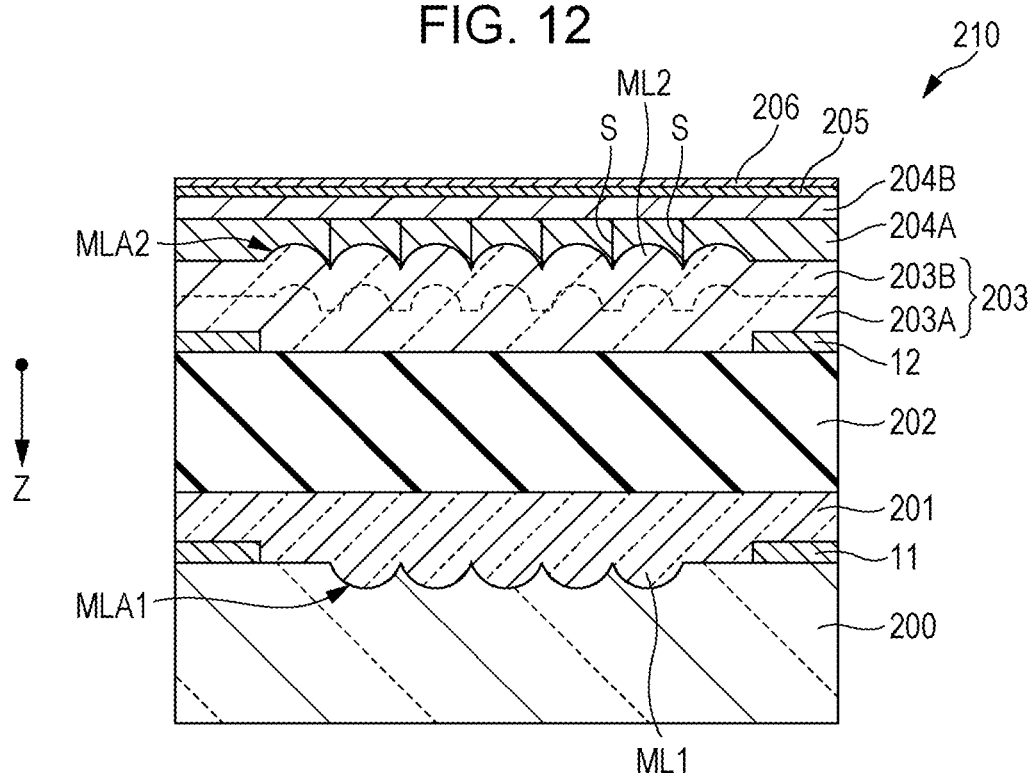
FIG. 12 is a cross-sectional view illustrating a state where a common electrode and an alignment film were laminated on the second optical path length adjustment layer, in the process of manufacturing the liquid crystal device according to the first embodiment.

Further, by polishing a surface of the second optical path length adjustment layer 204B, a surface texture is set. Thereafter, as shown in FIG. 12, the common electrode 205 and the alignment film 206 are laminated on the second optical path length adjustment layer 204B.

since the second optical path length adjustment layer 204B is laminated on the polished surface 204Ab, the slits S are not formed. As described above, by forming the second optical path length adjustment layer 204B having no slit S, the slits S have no effect on the common electrode 205 which is laminated on the second optical path length adjustment layer 204B. That is, the common electrode 205 can be prevented from being discontinuously formed due to the effect of the slits S.

As described above, according to the embodiment, the counter substrate 210 having the first and second microlenses ML1 and ML2 can be formed. Further, the slits S, each of which extends from the valley portion 203b toward the liquid crystal layer 250 between the adjacent second microlenses ML2, are formed on the first optical path length adjustment layer 204A. Furthermore, after the first optical path length adjustment layer 204A is polished, by forming the second optical path length adjustment layer 204B on the polished surface 204Ab, the common electrode 205 can be prevented from being discontinued due to the effect of the slits S.

Modification Example of First Embodiment

Next, a modification example of the first embodiment will be described.

Figure 13:
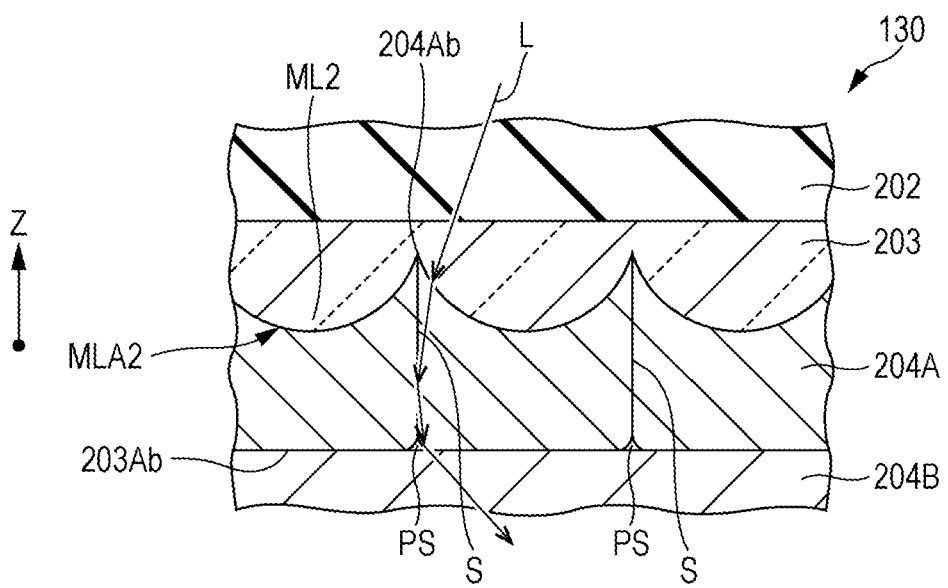
FIG. 13 is a diagram illustrating a cross-sectional configuration of a liquid crystal device according to a modification example of the first embodiment.

FIG. 13 is a partial cross-sectional diagram illustrating a configuration of a liquid crystal device 130 according to the modification example of the first embodiment. Compared with the liquid crystal device 120 of the first embodiment, the liquid crystal device 130 is different in the configuration of the slits S. It should be noted that the description and the figures of the other common components will be omitted.

As shown in FIG. 13, the slits S of the liquid crystal device 130 partition the first optical path length adjustment layer 204A into parts corresponding to the respective second microlenses ML2. Each slit S has a prism slit PS at the front end thereof close to the second optical path length adjustment layer 204B.

The prism slit (slit) PS has a substantially triangular shape. The bottom of the triangular shape is close to the second optical path length adjustment layer 204B, and one vertex thereof intersects with the slit S. That is, the prism slit PS has a shape of which the width gradually increases from the side of the boundary portion (valley portion 204Ad) between the second microlenses ML2 toward the side of the second optical path length adjustment layer 204B. Consequently, the distance between the prism slits PS adjacent to each other becomes narrowest at the boundary between itself and the second optical path length adjustment layer 204B.

As shown in FIG. 13, light L, which is incident at a large incident angle into the linear slit S, is reflected, and is subsequently intended to travel toward the light shielding region NA (refer to FIG. 2) along the slit S without change. However, in a manner similar to the modification example, the prism slits PS are formed, and the light L is incident into the prism slits PS. When the light L is incident into each prism slit PS, by reflecting the light L along the oblique side of the triangular shape, it is possible to return the light back to the opening region GA (refer to FIG. 2). That is, the light L, which travels along the linear slit S, can also be made to be incident into the opening region GA, it is possible to improve the transmittance of light of the liquid crystal device 130.

Next, an example of a method of manufacturing the liquid crystal device 130 as the modification example of the first embodiment will be described. Compared with the method of manufacturing the liquid crystal device 120 of the first embodiment, the method of manufacturing the liquid crystal device 130 is different only in the process of polishing the first optical path length adjustment layer.

FIG. 9A shows a state in which the first optical path length adjustment layer 204A is laminated, in a process of manufacturing the counter substrate 210. Further, FIG. 9B is a partially enlarged view of the vicinity of the second microlenses ML2 of FIG. 9A.

Figure 9B:
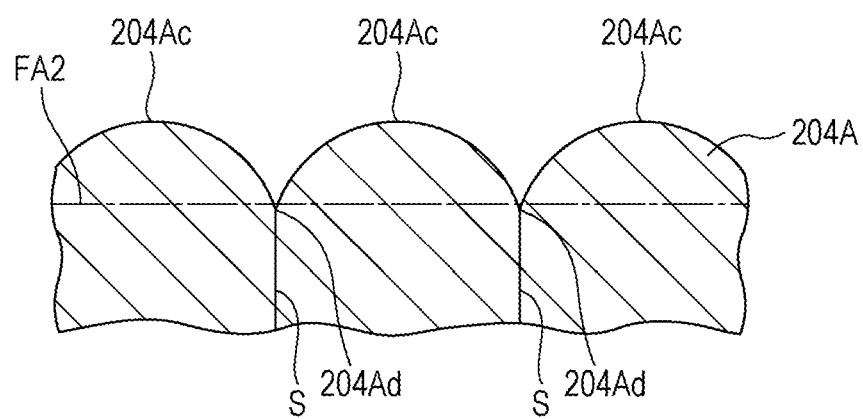

In the manufacturing method according to the modification example, in the states shown in FIGS. 9A and 9B, the first optical path length adjustment layer 204A is polished until reaching a target line FA2 (a process of polishing the first optical path length adjustment layer). The target line FA2 passes the slightly upper side of the narrowest portions of the valley portions 204Ad which are formed on the surface 204Aa of the first optical path length adjustment layer 204A. That is, through the process of polishing the first optical path length adjustment layer, for the first optical path length adjustment layer 204A, the upper sides of the convex portions 204Ac are planarized, and small portions of the valley portions 204Ad formed as peripheral portions of the convex portions 204Ac remain. Thereafter, by forming the second optical path length adjustment layer 204B, the prism slits PS are formed.

In the modification example formed as described above, there is a space inside each prism slit PS. However, by changing a lamination condition of the second optical path length adjustment layer 204B, the inside of the prism slit PS may be filled with the second material forming the second optical path length adjustment layer 204B.

Second Embodiment

Next, a second embodiment will be described.

Figure 14:
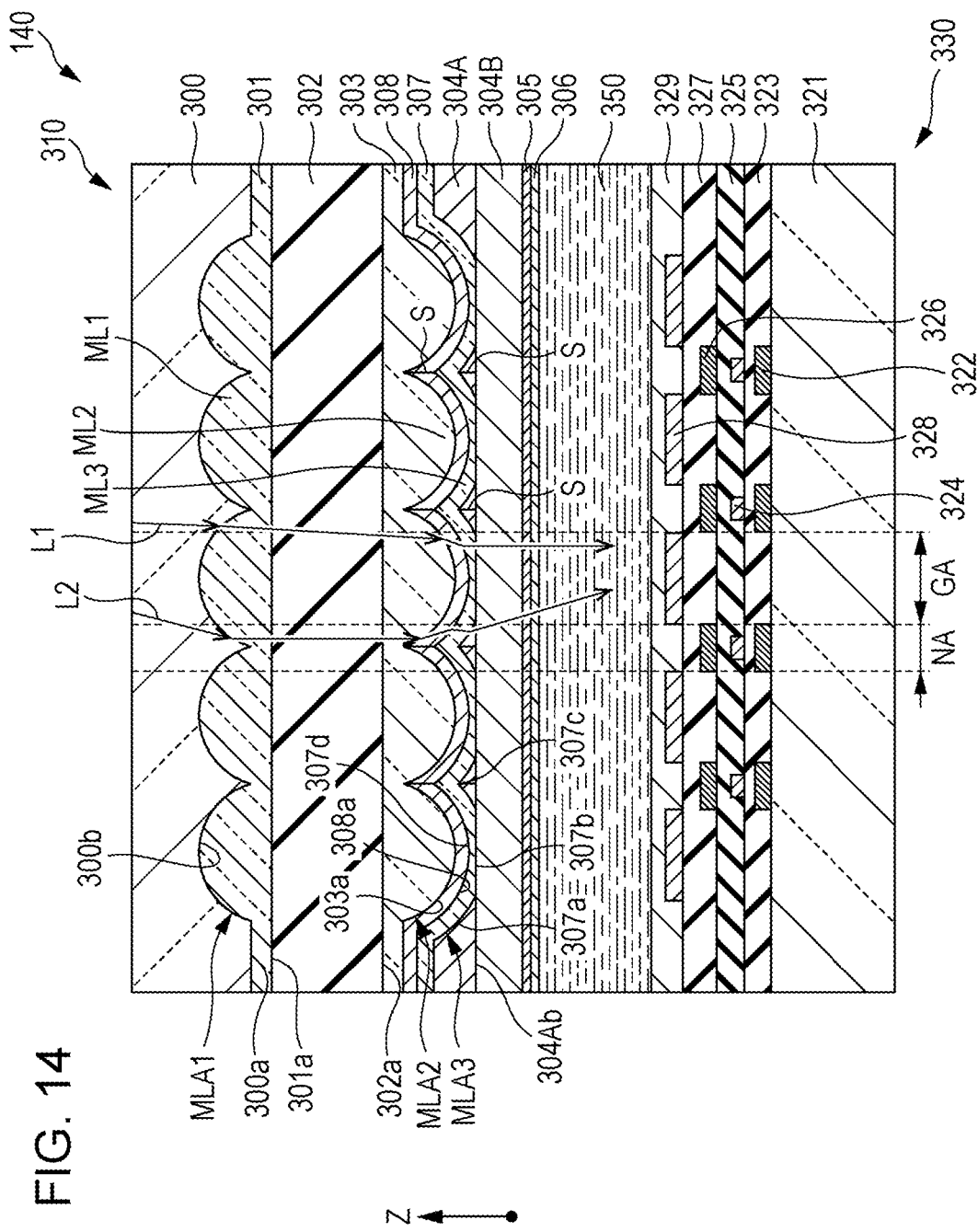
FIG. 14 is a diagram illustrating a cross-sectional configuration of the liquid crystal device according to a second embodiment.

FIG. 14 is a cross-sectional view illustrating a configuration of a liquid crystal device 140 according to the second embodiment. The liquid crystal device 140 has a structure in which the TFT array substrate 330 (element substrate) and the counter substrate 310 are combined with the liquid crystal layer 350 interposed therebetween.

As shown in FIG. 14, the counter substrate 310 includes, in order from the light incidence side (the upper side in the drawing), a base 300, a first lens layer 301, a light transmission layer 302, a second lens layer 303, an intervening layer (optical path length adjustment layer) 308, a third lens layer 307, a first optical path length adjustment layer 304A, a second optical path length adjustment layer 304B, a common electrode 305, and an alignment film 306.

The base 300 has a plurality of first concave portions 300b which are formed on the first surface 300a close to the liquid crystal layer 350.

The first lens layer 301 is laminated on the substantially entire surface of a first surface 300a of the base 300 including a plurality of first concave portions 300b, thereby forming the first microlenses ML1. The first microlenses ML1 are arranged in a matrix shape so as to respectively overlap with the plurality of pixels in plan view, and constitute a first microlens array MLA1.

The light transmission layer 302 is formed on a second surface 301a of the first lens layer 301 close to the liquid crystal layer 350.

The second lens layer 303 is formed of a third surface 302a of the light transmission layer 302 close to the liquid crystal layer 350. First convex portions (convexes) 303a, which are convex toward the liquid crystal layer 350, are formed on the second lens layer 303. The first convex portions 303a are positioned to overlap with the first microlenses ML1 in plan view, and are arranged in a matrix shape so as to respectively overlap with the plurality of pixels in plan view, similarly to the first microlenses ML1.

The intervening layer 308 is formed on the second lens layer 303. The intervening layer 308 has second convex portions (convexes) 308a on a side close to the liquid crystal layer 350 so as to transfer the first convex portions 303a of the second lens layer 303. The intervening layer 308 is formed of, for example, a material (second material) of which the optical refractive index is lower than the material (first material) of the second lens layer 303. The intervening layer 308 functions as an optical path length adjustment layer.

Further, the intervening layer 308 has slits S each of which extends from a valley portion (boundary portion) between the adjacent second convex portions 308a toward the third lens layer 307.

The third lens layer 307 is formed on the intervening layer 308. The third lens layer 307 has third convex portions (convexes) 307a on a side close to the liquid crystal layer 350 such that the third convex portions 307a are arranged in a manner similar to that of the second convex portions 308a of the intervening layer 308. Each third convex portion 307a has a planar surface 307b in the vicinity of the center thereof. The second optical path length adjustment layer 304B is formed to be closer to the liquid crystal layer 350 than a surface (polished surface 304Ab) coplanar with the planar surface 307b.

Further, the third lens layer 307 is formed on the second convex portions 308a of the intervening layer 308, and thus concave shapes 307d are formed on a side of the intervening layer 308 close to the third lens layer 307.

The third lens layer 307 is formed of, for example, the material (first material) of the second lens layer 303.

The first optical path length adjustment layer 304A is formed to fill the gap between the third lens layer 307 and the second optical path length adjustment layer 304B. Further, the first optical path length adjustment layer 304A has slits S each of which extends from a valley portion (boundary portion) 307c between the adjacent third convex portions 307a toward the second optical path length adjustment layer 304B.

The second optical path length adjustment layer 304B is formed on a polished surface 304Ab as a planar surface of the first optical path length adjustment layer 304A and the third lens layer 307 close to the liquid crystal layer 350. The slits S are discontinued at the boundary between the first optical path length adjustment layer 304A and the second optical path length adjustment layer 304B.

The common electrode 305 is formed throughout the substantially entire surface of the second optical path length adjustment layer 304B. The alignment film 306 is formed to cover the common electrode 305.

In the embodiment, the slits S are not formed on the third lens layer 307, and the slits S are formed on each of the intervening layer 308 and the first optical path length adjustment layer 304A. However, the slits S may be formed on the third lens layer 307. In this case, the slits S are formed to penetrate the intervening layer 308, the third lens layer 307, and the first optical path length adjustment layer 304A.

Each first convex portion 303a of the second lens layer 303 is formed in a curved surface shape, and constitutes the second microlens ML2. The second microlenses ML2 are arranged in a matrix shape so as to overlap with the plurality of pixels in plan view, and constitute a second microlens array MLA2.

Further, the third lens layer 307 has third convex portions 307a on a side close to the liquid crystal layer 350, and each third convex portion 307a constitutes a third microlens ML3 having a concave shape 307d on the opposite side. The third microlens ML3 is a meniscus lens of which surfaces opposite to each other respectively have a concave shape and a convex shape. Further, the third microlens ML3 has a lens shape in which the planar surface 307b is provided at the center of the third convex portion 307a. The third microlenses ML3 are arranged in a matrix shape so as to overlap with the plurality of pixels in plan view, and constitute a third microlens array MLA3.

An example of the above-mentioned method of manufacturing the counter substrate 310 will be described. Compared with the method of manufacturing the counter substrate 210 of the first embodiment, the method of manufacturing the counter substrate 310 is different in that the intervening layer 308 and the third lens layer 307 are formed after the second lens layer 303 is formed.

FIG. 8 shows a state where the second lens layer 203 (corresponding to the second lens layer 303 in the embodiment) is laminated in the process of manufacturing the counter substrate 210 of the first embodiment.

In the manufacturing of the counter substrate 310 of the second embodiment, in the state shown in FIG. 8, the intervening layer 308 is laminated. The intervening layer 308 transfers the shape of the second lens layer 303 so as to from the second convex portions 308a on the surface.

Further, the third lens layer 307 is laminated on the surface of the intervening layer 308. Thereby, the third convex portions 307a, onto which the second convex portions 308a of the intervening layer 308 are transferred, are formed on the surface of the third lens layer 307.

Subsequently, in a manner similar to that of the first embodiment, the first optical path length adjustment layer 304A is formed. Further, by polishing the first optical path length adjustment layer 304A together with the centers of the third convex portions 307a of the third lens layer 307, the polished surface 304Ab is formed (the process of polishing the first optical path length adjustment layer). In the process of polishing the first optical path length adjustment layer, at the center of each third convex portion 307a, the planar surface 307b is formed.

Then, the second optical path length adjustment layer 304B is formed.

Subsequently, by laminating the common electrode 305 and the alignment film 306, it is possible to manufacture the counter substrate 310.

The TFT array substrate 330 includes, in order from the light emission side (the lower side in the drawing), a base 321, a light shielding portion 322, an insulation layer 323, thin film transistors (TFTs, switching elements) 324, an insulation layer 325, a light shielding portion 326, an insulation layer 327, pixel electrodes 328, and an alignment film 329.

The TFT array substrate 330 has the same configuration as the TFT array substrate 230 of the first embodiment, and the description thereof will be omitted herein.

As shown in FIG. 14, in the liquid crystal device 140 configured as described above, the light L1, which is vertically incident on the base 300, is first incident into the first microlenses ML1, and is refracted toward the center of the opening region GA. The light L1 is incident into the second microlenses ML2, and is refracted toward the center of the opening region GA. Next, the light L1 is incident into the third microlenses ML3. Each third microlens ML3 has a concave shape 307d on the light incidence side (that is, the side opposite to the liquid crystal layer 350). Consequently, the light L1 is incident into the third microlens ML3 so as to be refracted, and thereby the traveling direction thereof is approximated to the vertical direction of the liquid crystal device 140. The light L1 is emitted from the third microlenses ML3 through the planar surface 307b. Since the light L1 is rarely refracted on the planar surface 307b, and is emitted in the traveling direction approximate to the vertical direction. Further, the light L1 passes through the liquid crystal layer 350 and the TFT array substrate 330, and is emitted from the liquid crystal device 140.

The light L2 is incident obliquely to the base 300 of the portion corresponding to the light shielding region NA. The light L2 is refracted toward the center of the opening region GA through the first and second microlenses ML1 and ML2. Next, the light is incident into the third microlenses ML3, and is refracted toward the light shielding region NA. Further, when emitted from the third microlens ML3, the light is refracted toward the center of the opening region GA in the third convex portion 307a.

Through the third microlens ML3, similarly to the light L1, the light, which passes through the vicinity of the center of the lens when emitted, is emitted while being kept traveling in the vertical direction. Thereby, the light traveling in the vertical direction can be made to be incident into the liquid crystal layer 350. By making the light, which travels in the substantially vertical direction, incident into the liquid crystal layer 350, it is possible to suppress bright black which is caused by disparity between the optical path lengths. Further, since the light L1 is emitted from the liquid crystal device 140 as light traveling along the vertical direction, it is possible to increase light use efficiency in an optical system subsequent to the liquid crystal device 150.

Further, the third microlens ML3 refracts light such as the light L2, which passes through the vicinity of the periphery, so as to travel toward the center of the opening region GA. Thereby, by reducing the light incident on the light shielding portions 322 and 326, it is possible to improve the transmittance of light.

That is, according to the liquid crystal device 140 of the second embodiment, the light, which passes through the center of the third microlens ML3, can be made to travel straight ahead, and the light, which passes through the vicinity of the periphery of the third microlens ML3, can be refracted toward the center. Consequently, distribution of the light can be concentrated in the vicinity of the center.

The liquid crystal device 140 of the second embodiment has the slits S on the emission side of the second microlenses ML2 and the third microlenses ML3. Thereby, by reflecting a part of the light, which will travel toward the light shielding region NA, on the slit S so as to travel toward the center of the opening region GA, it is possible to increase the transmittance of light. This effect is the same as that of the first embodiment.

It should be noted that, in the liquid crystal device 140 of the embodiment, a magnitude relationship of the optical refractive indexes of the materials forming the following respective layers of the counter substrate 310 is just an example: the base 300, the first lens layer 301, the light transmission layer 302, the second lens layer 303, the intervening layer 308, the third lens layer 307, the first optical path length adjustment layer 304A, and the second optical path length adjustment layer 304B. In order to increase the transmittance of light, by appropriately changing the materials forming the layers, it is possible to adjust the path of light.

Third Embodiment

Next, a third embodiment will be described.

Figure 15:
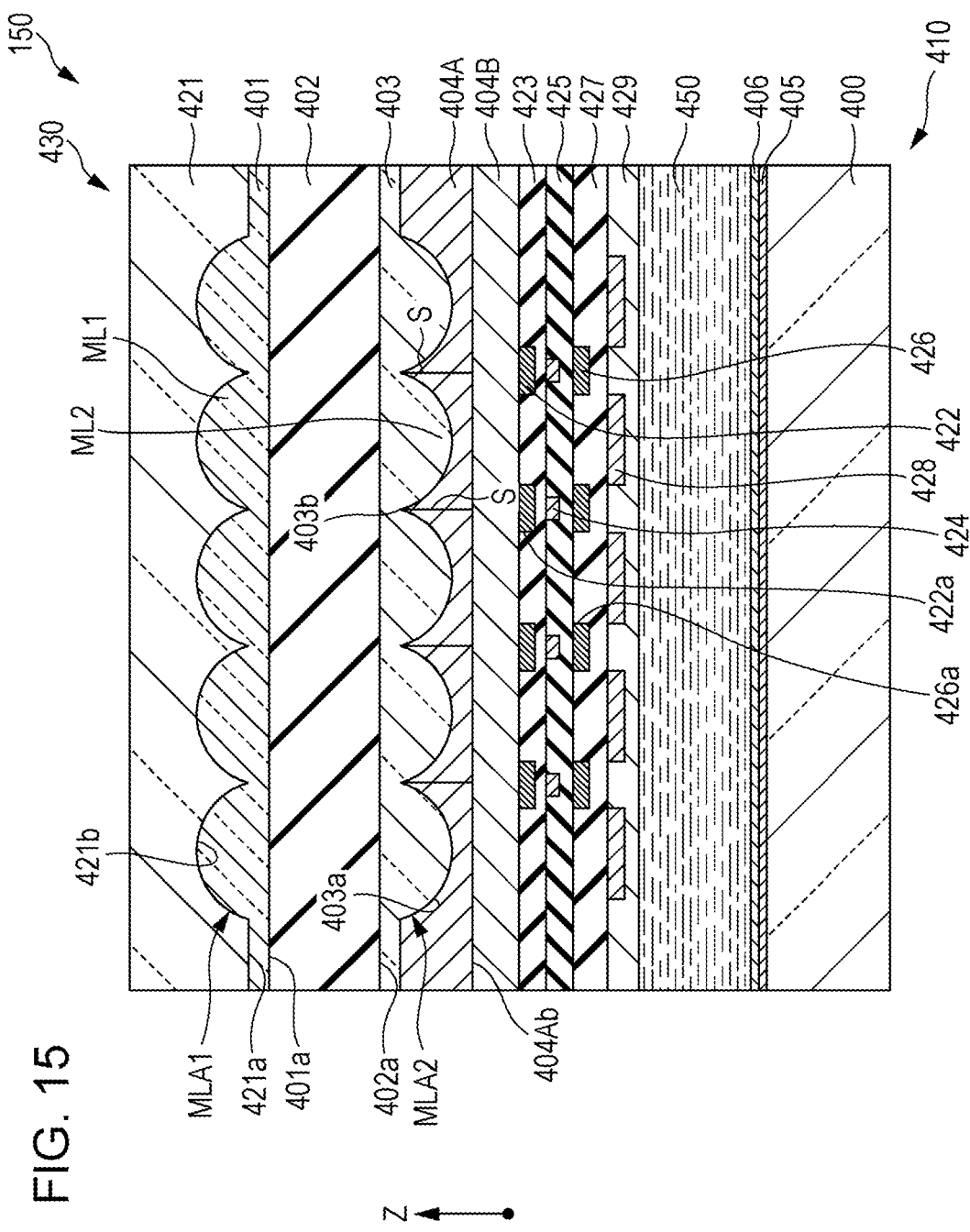
FIG. 15 is a diagram illustrating a cross-sectional configuration of the liquid crystal device according to a third embodiment.

FIG. 15 is a cross-sectional view illustrating a configuration of a liquid crystal device 150 according to the third embodiment. The liquid crystal device 150 has a structure in which the TFT array substrate 430 (element substrate) and the counter substrate 410 are combined with the liquid crystal layer 450 interposed therebetween.

In the liquid crystal device 150, the TFT array substrate 430 is disposed on the light incidence side, and the counter substrate 410 is disposed on the light emission side.

As shown in FIG. 15, the TFT array substrate 430 includes, in order from the light incidence side (the upper side in the drawing), a base 421, a first lens layer 401, a light transmission layer 402, a second lens layer 403, a first optical path length adjustment layer 404A, a second optical path length adjustment layer 404B, light shielding portions 422, an insulation layer 423, thin film transistors (TFTs, switching elements) 424, an insulation layer 425, light shielding portions 426, an insulation layer 427, pixel electrodes 428, and an alignment film 429.

The base 421 has a plurality of first concave portions 421b which are formed on the first surface 421a close to the liquid crystal layer 450.

The first lens layer 401 is laminated on the substantially entire surface of a first surface 421a of the base 421 including a plurality of first concave portions 421b, thereby forming the first microlenses ML1. The first microlenses ML1 are arranged in a matrix shape so as to respectively overlap with the plurality of pixels in plan view, and constitute the first microlens array MLA1.

The light transmission layer 402 is formed on a second surface 401a of the first lens layer 401 close to the liquid crystal layer 450.

The second lens layer 403 is formed of a third surface 402a of the light transmission layer 402 close to the liquid crystal layer 450. Convex portions (convexes) 403a, which are convex toward the liquid crystal layer 450, are formed on the second lens layer 403. The convex portions 403a are positioned to overlap with the first microlenses ML1 in plan view, and are arranged in a matrix shape so as to respectively overlap with the plurality of pixels in plan view, similarly to the first microlenses ML1. Further, the first optical path length adjustment layer 404A is formed to cover and planarize the unevenness caused by the convex portions 403a.

Each convex portion 403a is formed in a curved shape, and constitutes the second microlens ML2. Further, the second microlenses ML2 are arranged in a matrix shape so as to respectively overlap with the plurality of pixels in plan view, and constitute the second microlens array MLA2.

The first optical path length adjustment layer 404A has slits S each of which extends from the valley portion (boundary portion) 403b toward the liquid crystal layer 450 between the adjacent second microlenses ML2.

The second optical path length adjustment layer 404B is formed on a polished surface 404Ab as a planar surface of the first optical path length adjustment layer 404A close to the liquid crystal layer 450.

Each TFT 424 is a switching element which drives the pixel electrode 428.

Each gate electrode is formed on the TFT array substrate 430 with a part (gate insulation film) of the insulation layer 425 interposed therebetween in a region overlapping with the channel region of the semiconductor layer in plan view.

The light shielding portion 422 and the light shielding portion 426 are disposed with the TFTs 424 interposed therebetween in the thickness direction of the TFT array substrate 430.

The pixel electrodes 428 are provided in regions overlapping with opening portions 422a and 426a of the light shielding portions 422 and 426 in plan view. The TFTs 424, the electrodes and wires, which supply the electrical signals to the TFTs 424 and are not shown in the drawing, and the like are provided in regions overlapping with the light shielding portions 422 and the light shielding portions 426 in plan view.

The alignment film 429 is formed to cover the pixel electrodes 428.

Further, the counter substrate 410 includes, in order from the light emission side (the lower side in the drawing), the base 400, the common electrode 405, and the alignment film 406.

The common electrode 405 and the alignment film 406 are formed to cover the base 400.

In the liquid crystal device 150 of the third embodiment, the first and second microlens arrays MLA1 and MLA2 and the slits S are formed on the light incidence side. Consequently, the liquid crystal device 150 of the third embodiment has the same effect as the liquid crystal device 120 of the first embodiment.

That is, when light is concentrated through the first and second microlens arrays MLA1 and MLA2, by reducing the light incident on the light shielding portions 422 and 426, it is possible to improve the transmittance of light.

Further, when light is concentrated through the first microlens array MLA1 and the angle of the light is approximated to the vertical direction through the second microlens array MLA2, it is possible to suppress bright black.

In addition, by forming the slits S, the light, which will be incident on the light shielding portions 422 and 426 at an angle, can be reflected, and can be incident on the pixel electrodes 428. Thereby, it is possible to increase the transmittance of light.

In the example of the first embodiment, the counter substrate is set as the light incidence side, and the first microlens array, the second microlens array, and the slits are disposed on the counter substrate. Further, in the example of the third embodiment, the element substrate is set as the light incidence side, and the first microlens array, the second microlens array, and the slits are disposed on the element substrate. In both examples, the first microlens array, the second microlens array, and the slits are formed in order from the light incidence side. Thereby, the effect of increasing the transmittance of light is obtained.

Otherwise, the following configuration may be made: the counter substrate is set as the light incidence side, the first microlens array is disposed on the counter substrate, and the second microlens array and the slits are disposed on the element substrate. With such a configuration, it is also possible to obtain the same effect as those of the first and third embodiments.

Fourth Embodiment

Next, a fourth embodiment will be described.

Figure 16:
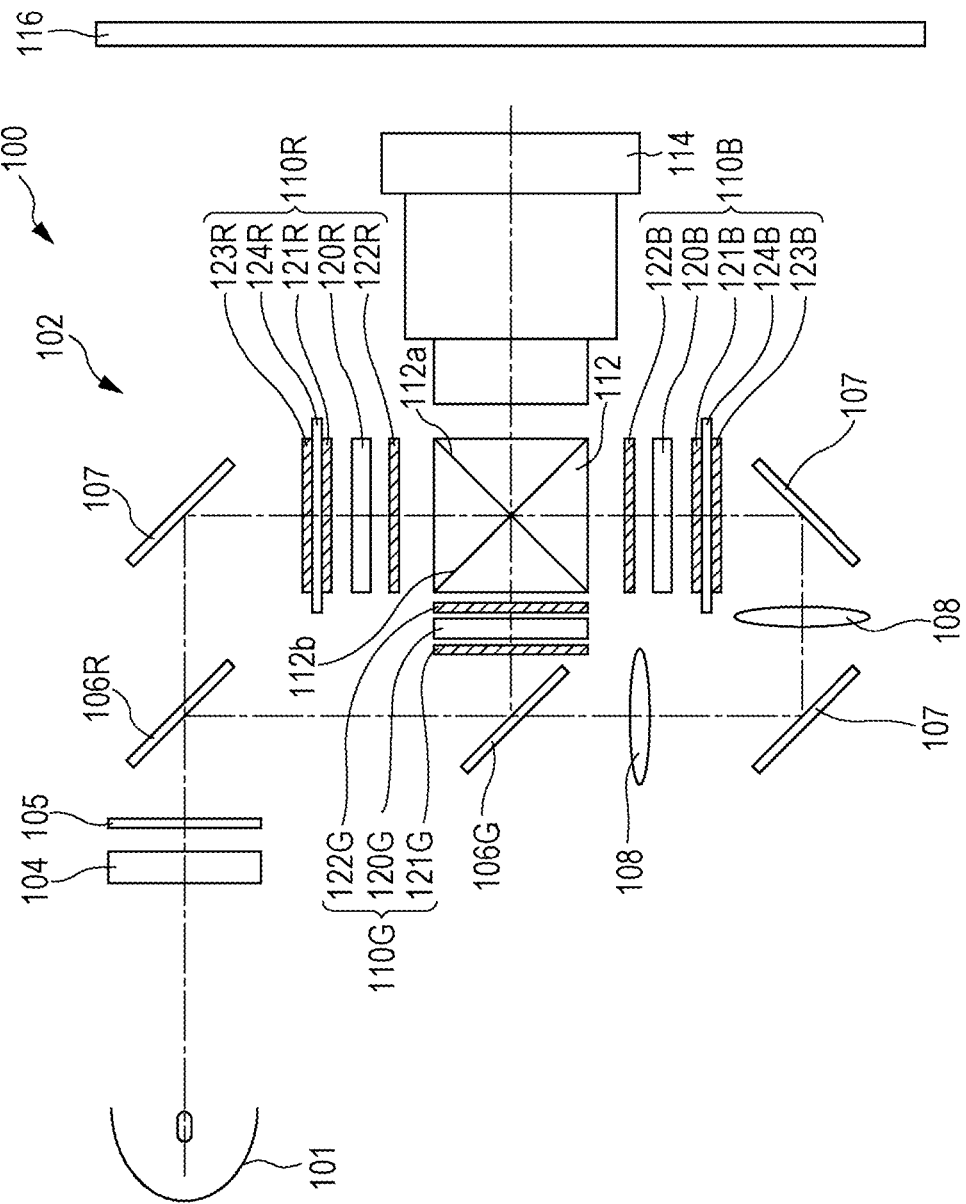
FIG. 16 is a diagram illustrating a configuration of a projector according to a fourth embodiment.

FIG. 16 is a schematic diagram illustrating an optical system of a projector 100 according to the embodiment.

As shown in FIG. 16, the projector 100 includes, a light source device 101, an integrator 104, a polarization conversion element 105, a color separation light-guiding optical system 102, a liquid crystal light-modulation device 110R as a light modulation device, a liquid crystal light-modulation device 110G, a liquid crystal light-modulation device 110B, a cross dichroic prism 112, and a projection optical system 114. In the liquid crystal light-modulation devices 110R, 110G and 110B, as described later, liquid crystal devices 120R, 120G, and 120B are provided. As the liquid crystal devices 120R, 120G, and 120B, for example, it is possible to use the liquid crystal device 120 described in the embodiments.

The light source device 101 supplies light including: red light (hereinafter referred to as "R light") which is first color light; green light (hereinafter referred to as "G light") which is second color light; and blue light (hereinafter referred to as "B light") which is third color light. As the light source device 101, for example, an ultra-high pressure mercury lamp.

The integrator 104 uniformizes illuminance distribution of the light emitted from the light source device 101. The light, of which the illuminance distribution is uniformized, is converted into polarized light having a specific oscillation direction in the polarization conversion element 105, for example, s-polarized light which is s-polarized on a reflective surface of the color separation light-guiding optical system 102. The light converted into the s-polarized light is incident on an R-light transmission dichroic mirror 106R constituting the color separation light-guiding optical system 102.

The color separation light-guiding optical system 102 includes an R-light transmission dichroic mirror 106R, a B-light transmission dichroic mirror 106G, three reflection mirrors 107, and two relay lenses 108.

The R-light transmission dichroic mirror 106R transmits the R light, and reflects the G light and the B light. The R light transmitted through the R-light transmission dichroic mirror 106R is incident on the reflection mirror 107.

The reflection mirror 107 deflects the optical path of the R light by 90 degrees. The R light, of which the optical path is deflected, is incident on the R-light liquid crystal light-modulation device 110R. The R-light liquid crystal light-modulation device 110R is a transmissive liquid crystal device that modulates the R light in response to an image signal.

The R-light liquid crystal light-modulation device 110R includes a λ/2 retardation plate 123R, a glass plate 124R, a first polarization plate 121R, a liquid crystal device 120R, and a second polarization plate 122R. The λ/2 retardation plate 123R and the first polarization plate 121R are disposed so as to be in contact with a transparent glass plate 124R that does not convert the polarization direction. In FIG. 16, the second polarization plate 122R is independently disposed, but may be disposed so as to be in contact with an emission surface of the liquid crystal device 120R or an incident surface of the cross-dichroic prism 112.

The optical paths of the G light and the B light, which are reflected from the R-light transmission dichroic mirror 106R, are deflected by 90 degrees. The G light and the B light, of which the optical paths are deflected, are incident on the B-light transmission dichroic mirror 106G. The B-light transmission dichroic mirror 106G reflects the G light and transmits the B light. The G light, which is reflected from the B-light transmission dichroic mirror 106G, is incident on the G-light liquid crystal light-modulation device 110G. The G-light liquid crystal light-modulation device 110G is a transmissive liquid crystal device that modulates the G light in response to an image signal. The G-light liquid crystal light-modulation device 110G includes a liquid crystal device 120G, a first polarization plate 121G, and a second polarization plate 122G.

The G light, which is incident on the G-light liquid crystal light-modulation device 110G, is converted into the s-polarized light. The s-polarized light, which is incident on the G-light liquid crystal light-modulation device 110G, is transmitted through the first polarization plate 121G without change, and is incident on the liquid crystal device 120G. The s-polarized G light, which is incident on the liquid crystal device 120G, is converted into p-polarized light by modulation performed in response to an image signal. The G light, which is converted into the p-polarized light by the modulation of the liquid crystal device 120G is emitted from the second polarization plate 122G. In such a manner, the G light, which is modulated by the G-light liquid crystal light-modulation device 110G, is incident on the cross-dichroic prism 112.

The B light, which is transmitted through the B-light transmission dichroic mirror 106G, is incident on the B-light liquid crystal light-modulation device 110B through the two relay lenses 108 and the two reflection mirrors 107.

The B-light liquid crystal light-modulation device 110B is a transmissive liquid crystal device that modulates the B light in response to an image signal. The B-light liquid crystal light-modulation device 110B includes a λ/2 retardation plate 123B, a glass plate 124B, a first polarization plate 121B, a liquid crystal device 120B, and a second polarization plate 122B.

The B light, which is incident on the B-light liquid crystal light-modulation device 110B, is converted into s-polarized light. The s-polarized light, which is incident on the B-light liquid crystal light-modulation device 110B, is converted into p-polarized light by the λ/2 retardation plate 123B. The B light, which is converted into the p-polarized light, is transmitted through the glass plate 124B and the first polarization plate 121B without change, and is incident on the liquid crystal device 120B. The p-polarized B light, which is incident on the liquid crystal device 120B, is converted into s-polarized light by modulation performed in response to an image signal. The B light, which is converted into the s-polarized light by the modulation of the liquid crystal device 120B, is emitted from the second polarization plate 122B. The B light, which is converted by the B-light liquid crystal light-modulation device 110B, is incident on the cross-dichroic prism 112.

As described above, the R-light transmission dichroic mirror 106R and the B-light transmission dichroic mirror 106G constituting the color separation light-guiding optical system 102 separates the light, which is supplied from the light source device 101, into the R light as the first color light, the G light as the second color light, and the B light as the third color light.

The cross-dichroic prism 112, which is a color synthesizing optical system, is configured such that two dichroic films 112a and 112b are orthogonal to each other in an X shape. The dichroic film 112a reflects the B light, and transmits the G light. The dichroic film 112b reflects the R light, and transmits the G light. In such a manner, the cross-dichroic prism 112 synthesizes the R light, the G light, and the B light modulated respectively by the R-light liquid crystal light-modulation device 110R, the G-light liquid crystal light-modulation device 110G, and the B-light liquid crystal light-modulation device 110B.

The projection optical system 114 projects the light synthesized by the cross-dichroic prism 112 to a screen 116. Thereby, a full color image can be obtained on the screen 116.

As described above, according to the embodiments, there are provided inexpensive liquid crystal devices 120R, 120G, and 120B (liquid crystal device 120) having the desired quality. Therefore, it is possible to obtain an inexpensive projector 100 having the desired quality.

Further, according to the embodiments, light is emitted in a direction approximate to the vertical direction of the liquid crystal devices 120R, 120G, and 120B (liquid crystal device 120). Hence, it is possible to reduce the amount of light emitted at angle which is greater than the uptake angle of the projection optical system 114. Thereby, it is possible to increase the light use efficiency.

The technical scope of the invention is not limited to the embodiments, and may be appropriately modified without departing from the spirit of the invention.

For example, in the embodiment, as an electro-optical device, the liquid crystal device 120 was exemplified, but the electro-optical device is not limited to this. For example, the invention can be applied to other optical devices such as an electrophoretic display device, in which the electrophoresis elements are sandwiched between the TFT array substrate (element substrate) and the counter substrate, and an organic EL device, in which an organic EL layer is formed on the TFT array substrate (element substrate). Further, the present technology can also be applied to the followings: a front-projection-type projector that performs projection from a side for observing a projection image; and a rear-projection-type projector that performs projection from a side opposite to the side for observing a projection image.

Further, examples of the electronic apparatus include not only the projector 100 but also a multimedia-enabled personal computer (PC), an engineering workstation (EWS), a pager, a mobile phone, a word processor, a television, a viewfinder-type or monitor-direct-view video tape recorder, an electronic notebook, an electronic desk calculator, a car navigation system, a POS terminal, a touch panel, and the like.

The entire disclosure of Japanese Patent Application No. 2014-075174, filed Apr. 1, 2014 is expressly incorporated by reference herein.

What is claimed is:

1. A liquid crystal device comprising:
an element substrate and a counter substrate that face each other with a liquid crystal layer interposed therebetween;
a pixel electrode that is provided on a surface of the element substrate close to the liquid crystal layer;
a switching element that is provided between the element substrate and the pixel electrode; and
a light shielding portion that shields light which is incident into the switching element,
wherein the liquid crystal device includes a first lens array that is provided to be closer to a light incident side of the liquid crystal device than the light shielding portion, and a second lens array that is provided between the first lens array and the light shielding portion,
wherein the second lens array includes a plurality of first lenses each of which has a surface convex toward the light shielding portion, and
wherein the second lens array includes a first slit which is provided between two first lenses adjacent to each other among the plurality of first lenses of the second lens array so as to extend toward the light shielding portion.

2. The liquid crystal device according to claim 1, wherein in the second lens array, an optical path length adjustment layer is formed to be close to the light shielding portion of the plurality of first lenses of the second lens array, and the first slit is formed on the optical path length adjustment layer.

3. The liquid crystal device according to claim 2,
wherein the optical path length adjustment layer of the second lens array includes a material of which a refractive index is different from that of the plurality of first lenses of the second lens array, and
wherein parts partitioned by the first slit of the optical path length adjustment layer are not joined while being in contact.

4. The liquid crystal device according to claim 1, further comprising a third lens array that is provided between the second lens array and the light shielding portion,
wherein the third lens array includes a plurality of second lenses each of which has a surface convex toward the light shielding portion, and
wherein the third lens array includes a second slit which is provided between two second lenses adjacent to each other among the plurality of second lenses of the third lens array so as to extend toward the light shielding portion.

5. The liquid crystal device according to claim 1, wherein a width of the first slit closer to the light incident side is narrower than a width of the first slit closer to the light shielding portion.

6. The liquid crystal device according to claim 1, wherein the first lens array, the second lens array, and the first slit are provided on the counter substrate.

7. The liquid crystal device according to claim 1, wherein the first lens array, the second lens array, and the first slit are provided on the element substrate.

8. An electronic apparatus comprising the liquid crystal device according to claim 1.

9. An electronic apparatus comprising the liquid crystal device according to claim 2.

10. An electronic apparatus comprising the liquid crystal device according to claim 3.

11. An electronic apparatus comprising the liquid crystal device according to claim 4.

12. An electronic apparatus comprising the liquid crystal device according to claim 5.

13. An electronic apparatus comprising the liquid crystal device according to claim 6.

14. An electronic apparatus comprising the liquid crystal device according to claim 7.

15. A method of manufacturing a liquid crystal device comprising:
- forming a lens array shape section on a surface of a first material;
- forming a lens array, in which a plurality of convexes is arranged, by etching the lens array shape section and the surface of the first material so as to transfer a shape of the lens array shape section to the surface of the first material; and
- forming a first optical path length adjustment layer, which covers the lens array, and growing a slit, which is provided between two convexes adjacent to each other among the plurality of convexes of the lens array, by laminating a second material, of which an optical refractive index is different from the first material, on the lens array.

16. The method of manufacturing a liquid crystal device according to claim 15, further comprising
- polishing the first optical path length adjustment layer by polishing a surface of the second material opposite to a surface thereof close to the first material, after the forming of the first optical path length adjustment layer.

17. The method of manufacturing a liquid crystal device according to claim 16, further comprising
- forming a second optical path length adjustment layer by further laminating the second material, after the polishing of the first optical path length adjustment layer.

* * * * *